(12) United States Patent
Gianniotis et al.

(10) Patent No.: US 9,349,026 B2
(45) Date of Patent: May 24, 2016

(54) ANONYMIZATION AND FILTERING DATA

(75) Inventors: Adam Gianniotis, Newbury (GB);
Gerald Mcquaid, Newbury (GB);
Stephen Babbage, Newbury (GB)

(73) Assignee: Vodafone IP Licensing Limited,
Newbury, Berkshire (GB)

( * ) Notice: Subject to any disclaimer, the term of this patent is extended or adjusted under 35 U.S.C. 154(b) by 0 days.

(21) Appl. No.: 14/234,366

(22) PCT Filed: Jul. 20, 2012

(86) PCT No.: PCT/GB2012/051752
§ 371 (c)(1),
(2), (4) Date: Jun. 19, 2014

(87) PCT Pub. No.: WO2013/014431
PCT Pub. Date: Jan. 31, 2013

(65) Prior Publication Data
US 2014/0304825 A1 Oct. 9, 2014

(30) Foreign Application Priority Data
Jul. 22, 2011 (GB) .................................. 1112665.3

(51) Int. Cl.
*H04L 29/06* (2006.01)
*G06F 21/62* (2013.01)
*G06F 21/60* (2013.01)

(52) U.S. Cl.
CPC ............ *G06F 21/6254* (2013.01); *G06F 21/60* (2013.01); *G06F 21/602* (2013.01); *H04L 63/0407* (2013.01); *H04L 63/0435* (2013.01)

(58) Field of Classification Search
CPC .................................................. G06F 21/6254
See application file for complete search history.

(56) References Cited

U.S. PATENT DOCUMENTS

| 6,564,261 | B1 | 5/2003 | Gudjonsson et al. |
| 8,407,246 | B2 * | 3/2013 | Bezzi ................ G06F 17/30386 707/781 |
| 2002/0073099 | A1 | 6/2002 | Gilbert et al. |
| 2003/0039362 | A1 | 2/2003 | Califano et al. |
| 2004/0002903 | A1 * | 1/2004 | Stolfo et al. .................... 705/26 |
| 2004/0199789 | A1 | 10/2004 | Shaw et al. |
| 2005/0165623 | A1 | 7/2005 | Landi et al. |
| 2007/0038674 | A1 | 2/2007 | Bejar |

(Continued)

FOREIGN PATENT DOCUMENTS

DE 102006021371 A1 11/2007
GB 2485783 A 5/2012

OTHER PUBLICATIONS

International Searching Authority Search-Report-for-PCT/GB2012-051752 dated Nov. 7, 2012

(Continued)

*Primary Examiner* — Mohammad L Rahman
(74) *Attorney, Agent, or Firm* — Workman Nydegger

(57) ABSTRACT

System and method of anonymising data comprising the steps of reading parameters of an anonymisation procedure from a configurable anonymisation procedure resource. Receiving data to be anonymised from a data source, wherein the data source is identified by one or more of the read parameters. Applying one or more transformations to the received data according to the anonymisation procedure, wherein the one or more transformations include transforming at least an original portion of the received data into a transformed portion.

15 Claims, 11 Drawing Sheets

(56) References Cited

U.S. PATENT DOCUMENTS

| | | | |
|---|---|---|---|
| 2008/0240425 A1 | 10/2008 | Rosales et al. | |
| 2009/0282036 A1 | 11/2009 | Fedtke | |
| 2010/0042833 A1 | 2/2010 | Platt | |
| 2010/0074441 A1 | 3/2010 | Pauker | |
| 2010/0192220 A1* | 7/2010 | Heizmann et al. | 726/19 |
| 2011/0040736 A1 | 2/2011 | Kalaboukis et al. | |
| 2014/0351943 A1* | 11/2014 | Gianniotis | G06F 21/6254 726/26 |

OTHER PUBLICATIONS

IPO Search Report for GB1313315.2 dated Jan. 27, 2014.
International Preliminary Examination Report; Written Opinion of the ISR Authority for International Application No. PCT/GB2012/051751.
Adam Slagell et al: "FLAIM: A Multi-level Anonymization Framework for Computer and Network Logs", Proceedings of the 20th USENIX Large Installation System Administration Conference (LISA '06), Dec. 2006, pp. 63-77, XP55042606, Retrieved from the Internet: URL:http://static.usenix.org/event/lisa06/ tech/full_papers/slagell/slagell.pdf [retrieved on Oct. 30, 2010] abstract p. 64, left-hand column, lines 3-33 p. 66, left-hand column, line 25—p. 70, right-hand column, line 16; figures 1,2,3.
Christoph P Mayer et al: "PktAnon Manual Generic Framework for Profile-based Traffic Anonymization", Jun. 26, 2008, XP55042691, Retrieved from the Internet: URL:http://www.tm.uka.de/software/pktanon/ documentation/manual/pdf/PktAnon_Manual.pdf [retrieved on Oct. 30, 2010] chapters 2-4.
U.S. Appl. No. 14/234,365, filed Jun. 11, 2014, Gianniotis et al.
Benjamin C.M. Fung et al., "Privacy Protection for RFID Data"—SAC '09 Mar. 8-12m, 2009 Honolulu, Hawaii, U.S.A. Copyright pp. 1528-1535.
U.S. Appl. No. 14/234,365, filed May 18, 2015, Office Action.
U.S. Appl. No. 14/234,365, filed Nov. 30, 2015, Final Office Action.

* cited by examiner

□□□? □□□□□□□□□□□□
5 5 5 □□□4 4 7 7 7 7 1 2 3 4 5 6 □□□□□□□□□□Hello world
□□□? □□□□□□□□□□□□
5 5 5 □□□9 1 7 4 7 5 6 8 8 3 9 1 □□□□□□□□□□Hello world

| # | Category | Classification | Requirement |
|---|---|---|---|
| 1 | Anonymisation | Functional | Sensitive customer data attributes (MSISDN, IMSI, IMEI, B party number, Cell ID) shall be anonymised prior to leaving the secure environment. Refer to 'Appenix B: security anonymisation use cases' for more information |
| 2 | Anonymisation | Functional | The anonymised sensitive customer data attributes shall preferably be de-anonymised on entry back into the secure environment |
| 3 | Anonymisation | Functional | There shall preferably be a 1:1 relationship between the sensitive customer data attributes and the anonymised data values which represent them |
| 4 | Anonymisation | Functional | There shall preferably be no mathematical relationship between the sensitive customer data attributes and the anonymised data values which represent them |
| 5 | Anonymisation | Functional | The mapping between sensitive customer data attributes and anonymised data values shall preferably not be accessible to the third party |
| 6 | Anonymisation | Functional | All data which is not essential to the service and is not used by the MDP (Marketing Delivery Platform) shall preferably be filtered out prior to leaving the secure environment |
| 7 | Filtering | Functional | The filtering solution shall preferably have the ability both to filter out an attribute completely, and to mask an attribute, so that only part of its characters are passed to the MDP, eg. <br> -First 8 digits of the IMEI, to allow identification of handset make and model <br> -The prefix of a B number, to allow identification of the called country |
| 8 | Filtering | Functional | The filtering solution shall preferably be re-configurable allowing the data controller to change which data attributes are filtered out, in order to support an increase in the scope of the service |
| 9 | Filtering | Non-functional | The filtering solution shall preferably support SLA of 2 days for re-configuring the scope of filtered attributes |

FIG. 9

| 10 | Anonymisation & filtering | Functional | The anonymisation and filtering solution(s) shall preferably support attribute anonymisation and filtering for the following incoming and outgoing file formats: Fixed positions, Delimiter, YAML, XML |
|----|---------------------------|------------|---|
| 11 | Anonymisation & filtering | Functional | The anonymisation and filtering solution(s) shall preferably support attribute anonymisation and filtering for HTML over HTTP web application requests and responses |
| 12 | Anonymisation & filtering | Functional | The anonymisation and filtering solution(s) shall preferably support attribute anonymisation and filtering for the following incoming on-line interfaces: Web service or XML over HTTP |
| 13 | Anonymisation & filtering | Functional | The anonymisation and filtering solution(s) shall preferably support attribute anonymisation and filtering for the following outgoing on-line interfaces: Web service, XML over HTTP, SMPP, UCP/EMI |
| 14 | Anonymisation & filtering | Functional | The anonymisation and filtering solution(s) shall preferably process on-line requests separately from file records, so that file processing will not delay processing of on-line requests |
| 15 | Anonymisation & filtering | Non-functional | The anonymisation and filtering solution(s) shall preferably support processing of 200M file records per day, with latency of no more than 10 minutes |
| 16 | Anonymisation & filtering | Non-functional | The anonymisation and filtering solution(s) shall preferably support processing of 30 web application requests per second with latency of no more than 100 msec |
| 17 | Anonymisation & filtering | Non-functional | The anonymisation and filtering solution(s) shall preferably support processing of 200 incoming on-line requests per second with latency of no more than 100 msec |
| 18 | Anonymisation & filtering | Non-functional | The anonymisation and filtering solution(s) shall preferably support processing of 3M outgoing on-line requests per day with latency of no more than 200 msec |

FIG. 9 Cont'd

| 19 | Anonymisation & filtering | Non-functional | The solution should preferably be easily configurable to support anonymisation and filtering of new interfaces within 1 week. Such configuration should be available via a UI (i.e. without any coding) |
|---|---|---|---|
| 21 | Anonymisation & filtering | Non-functional | The anonymisation and filtering solution(s) shall preferably be scaleable in order to match projected growth in the volumes of inbound and outbound traffic for a secure boundary |
| 22 | Anonymisation & filtering | Non-functional | The RTO and RPO and redundancy requirements for the anonymisation and filtering solution(s) shall preferably match those of the service |
| 23 | Anonymisation & filtering | Non-functional | The filtering and anonymisation solution(s) shall preferably be developed centrally with an instance deployed in all of the secure boundaries that implement the service |
| 24 | Anonymisation & filtering | Non-functional | The solution shall preferably re-use existing capabilities already deployed within other secure boundaries or employ strategic solutions (e.g. ACR) where possible |

*FIG. 9* Cont'd

| # | Sensitive customer data attributs | | | | |
|---|---|---|---|---|---|
| 1 | - | - | - | - | Cell ID |
| 2 | - | - | - | B party number | - |
| 3 | - | - | - | B party number | Cell ID |
| 4 | - | - | IMEI | - | - |
| 5 | - | - | IMEI | - | Cell ID |
| 6 | - | - | IMEI | B party number | - |
| 7 | - | - | IMEI | B party number | Cell ID |
| 8 | - | IMSI | - | - | - |
| 9 | - | IMSI | - | - | Cell ID |
| 10 | - | IMSI | - | B party number | - |
| 11 | - | IMSI | - | B party number | Cell ID |
| 12 | - | IMSI | IMEI | - | - |
| 13 | - | IMSI | IMEI | - | Cell ID |
| 14 | - | IMSI | IMEI | B party number | - |
| 15 | - | IMSI | IMEI | B party number | Cell ID |
| 16 | MSISDN | - | - | - | - |
| 17 | MSISDN | - | - | - | Cell ID |
| 18 | MSISDN | - | - | B party number | - |
| 19 | MSISDN | - | - | B party number | Cell ID |
| 20 | MSISDN | - | IMEI | - | - |
| 21 | MSISDN | - | IMEI | - | Cell ID |
| 22 | MSISDN | - | IMEI | B party number | - |
| 23 | MSISDN | - | IMEI | B party number | Cell ID |
| 24 | MSISDN | IMSI | - | - | - |
| 25 | MSISDN | IMSI | - | - | Cell ID |
| 26 | MSISDN | IMSI | - | B party number | - |
| 27 | MSISDN | IMSI | - | B party number | Cell ID |
| 28 | MSISDN | IMSI | IMEI | - | - |
| 29 | MSISDN | IMSI | IMEI | - | Cell ID |
| 30 | MSISDN | IMSI | IMEI | B party number | - |
| 31 | MSISDN | IMSI | IMEI | B party number | Cell ID |

Key: ⌐ ¬ =use cases invalid because this combination of attributes cannot be used to uniquely identify a customer ☐ 10 =data attribute does not need to be anonymised ☐ =data attribute must be anonymised

*FIG. 10*

ANONYMIZATION AND FILTERING DATA

CROSS REFERENCE TO RELATED APPLICATIONS

This application is a U.S. Nationalization of PCT Application Number PCT/GB2012/051752, filed on Jul. 20, 2012, which claims priority to United Kingdom Patent Application No. 1112665.3, filed on Jul. 22, 2011, the entireties of which are incorporated herein by reference.

FIELD OF THE INVENTION

The present invention relates to a system and method for anonymising data and in particular for selectively anonymising data in a configurable way.

BACKGROUND OF THE INVENTION

Many businesses are faced with an apparent conflict between the need to respect their clear obligation to protect the security and privacy of their customers in their use of data, and a business imperative to maximise revenue opportunity by either exploiting or enriching the data. These opportunities increasingly involve exposing data to partners and third parties and the movement of data outside the protected network of the business. Protecting the data while still retaining sufficient usable data to enable the opportunity is a key challenge. In addition, in this increasingly global economy, data crosses borders increasingly and organisations need to ensure that they continue to comply with all the relevant regulatory requirements.

The ability to share data between repositories is an essential requirement for many businesses. Sharing data between repositories can become problematic when the data being shared is at least in part confidential, secret or otherwise sensitive.

There are many examples of systems which are arranged to securely share data between repositories, including systems for securing the repositories themselves, and securing the communication channels between repositories.

An additional problem arises when the source repository wishes to only share part of a data set with a destination repository.

Therefore, there is required a system and method that overcomes these problems.

SUMMARY OF THE INVENTION

The present invention relates to a system for anonymising and filtering data sets which are leaving a data repository within a secure environment to another environment that may or may not be secure, and a system for de-anonymising the data sets as they are returned back to the secure data repository.

The present invention provides a system and a method of transforming data in real-time, or near real-time from the original data set to an at least partially anonymised, filtered and masked data set suitable for transmission to a third party outside of a secure environment. The invention has the important additional feature of being able to receive an at least partially anonymised data set that has previously been transmitted outside of the secure environment and deanonymise the previously anonymised data, for storing the deanonymised data back in the source repository, or other location within the secure environment. The returning data set does not have to be identical to the original data set, provided that at least one identifier data item remains unaltered. This allows third parties to add to alter or in other ways enrich the transmitted data set prior to returning the data set to the secure environment. Additionally, the present invention provides the capability, using easily modified configuration data, to transform multiple data sets, of differing structure and apply different transformation techniques (for example anonymisation, masking, filtering) to each according to their type.

An anonymisation system and method filters, anonymises and/or otherwise transforms sensitive data before it is sent onwards, for example to an external third party. Furthermore, the anonymisation system is being able to also de-anonymise data as it is sent back to the originating party after analysis or enrichment.

The anonymisation system 10 supports a number of interfaces to route data and can apply a variety of transform and data quality rules to the data.

According to a first aspect there is provided a method of anonymising data comprising the steps of:

reading parameters of an anonymisation procedure from a configurable anonymisation procedure resource;

receiving data to be anonymised from a data source, wherein the data source is identified by one or more of the read parameters; and applying one or more transformations to the received data according to the anonymisation procedure, wherein the one or more transformations include transforming at least an original portion of the received data into a transformed portion. Therefore, routes or workflows through an anonymisation system may be predefined and configured for particular types of received data. Different data types may be processed in different ways. This allows efficient and convenient customisation especially where new data interfaces and/or data types are introduced or require anonymisation or other transformations.

Advantageously, this provides a faster, in-line, real-time, highly configurable and reversible method of anonymising data.

The method advantageously may consistently anonymised data to the same value when required. This provides referential integrity with data.

Preferably, the one or more transformations to be applied to the received data are identified or identifiable from the read parameters. The parameters read from the configurable anonymisation procedure resource may also define, describe, reference or point to a transformation configuration resource that describes the one or more transformations to be applied to the received data. The description may include particular functions to be applied to portions of the received data or identifiers of those functions or procedures, for example. The transformation configuration resource may also be configurable. The transformation configuration resource may contain rules or definitions of the transformations to undertake. The transformation configuration resource may also describe how and where to apply the transformations within the received data.

Optionally, the read parameters may further include or identify any one or more of:

a transformation configuration resource describing the one or more transformations to be applied to the received data;

a reader configuration resource describing how to read the received data;

an input directory of the data source or interface to scan for received data;

an output directory of the data source or interface to write transformed data following the application of the one or more transformations;

a writer configuration resource describing how to write out put data containing the applied transformations; and number of allowable concurrent processing threads.

Preferably, the transformation configuration resource and/or the configurable anonymisation procedure resource may be encrypted. This improves security.

Preferably, the original portion of the received data may be recoverable from the transformed portion using stored information. The stored information may be a copy of the transformed portion together with the original portion.

Optionally, the stored information may comprise the transformed portion stored with the original portion of received data. The transformed portion may be a token stored with the original portion within a token store, for example.

Optionally, the stored information is cryptographic material for decrypting the transformed portion into the original portion of received data. The stored information may also be cryptographic information such as a cryptographic key to decrypt the transformed portion, for example.

Preferably, the applied at least one transformation may be one or more selected from the group consisting of: hashing; redacting; filtering; find and replacing; replacement with random values; validation; and masking. Other transformations may be used.

Preferably, the transformation configuration resource and/or the configurable anonymisation procedure resource are in XML format. This facilitates easier configuration and editing. Other formats may be used.

Advantageously, the received data are call data records. Call data records or CDRs record events that occur within a mobile network. These include call connections, SMS messages being sent and/or received, data downloads occurring; handset roaming; and handovers between base stations, for example. Other data types may be used.

Preferably, the anonymisation procedure may include receiving the data from an input channel and writing the anonymised data to an output channel. The input and output channels may be described or defined within the configurable anonymisation procedure resource or the configurable anonymisation procedure resource may in turn reference a further configurable resource defining the channels.

Preferably, the received data may originate from any one or more of: a database, file system, mobile network, and real time data feed. The data may come from other locations or sources.

Preferably, the method may further comprise the steps of:
receiving an input comprising the transformed portion and a new portion; and
recovering the original portion of the received data from the transformed portion using stored information. In other words, these steps describe the receipt of previously transformed data once further processing has been carried out to create or modify data preferably associated or derived from the original data. Upon receipt, the original or identifying portion or portions of the data may be recovered so that the data is deanonymised. Stored information may be cryptographic keys required to decrypt the transformed portion or a database to allow the original value to be recovered, for example.

Preferably, the anonymisation procedure resource and/or parameters define a workflow or a definition of how the procedure will operate.

According to a second aspect there is provided an anonymisation system comprising:
a configurable anonymisation procedure resource including parameters of an anonymisation procedure;
a data source configured to receive data to be anonymised;

logic configured to:
read the parameters of the anonymisation procedure from the configurable anonymisation procedure resource, wherein the data source is identified by one or more of the read parameters; and
apply one or more transformations to the received data according to the anonymisation procedure, wherein the one or more transformations include transforming at least an original portion of the received data into a transformed portion.

Preferably, the system further comprises an input interface configured to interface with the data source. The interface may also or alternatively interpret, read or process the data source.

Preferably, the system further comprises an output interface for writing or transmitting the transformed portion and any associated untransformed portion. For real-time processing in particular, the output interface may transmit data using SMSC and/or HTTP, for example.

Optionally, the system further comprises a data store configured to store information that enables the original portion to be recovered from the transformed portion.

The methods described above may be implemented as a computer program comprising program instructions to operate a computer. The computer program may be stored on a computer-readable medium.

The methods described above may be implemented as a complete anonymisation system.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which:

FIG. 7 shows example input data and example output data following application of the method of FIG. 1;

FIG. 8 shows example input data and example output data following application of the method of FIG. 1;

FIG. 9 shows functional and non-functional requirements of a system for implementing the methods of FIGS. 1 and 2; and FIG. 10 shows a table of use cases that may be performed by the method of FIG. 1.

It should be noted that the figures are illustrated for simplicity and are not necessarily drawn to scale.

DETAILED DESCRIPTION OF THE PREFERRED EMBODIMENTS

Figure 1:
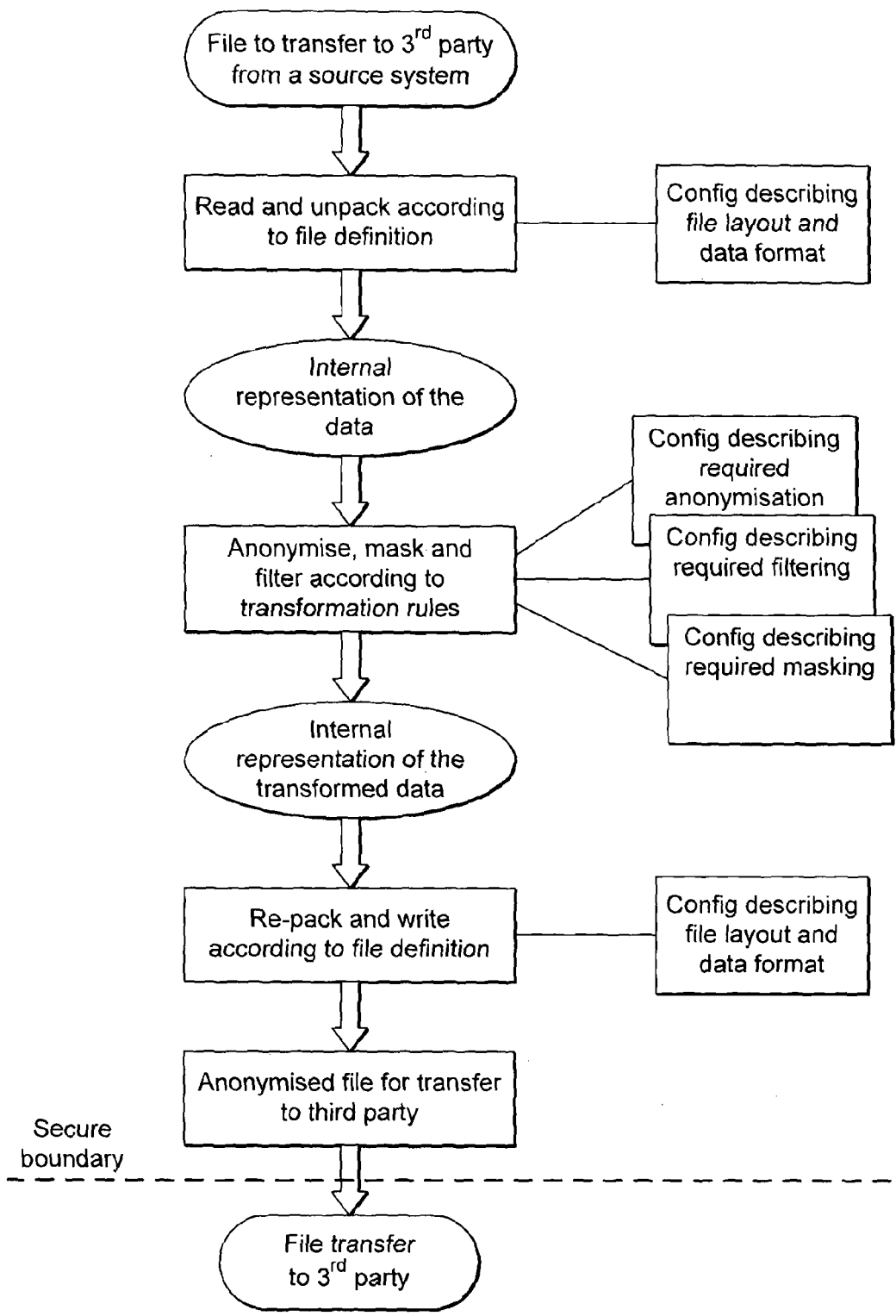
FIG. 1 shows a flow diagram of a method for anonymising data, given by way of example only.

FIG. 1 is a simplified flow diagram of a first embodiment of the anonymisation system, illustrating the process of anonymising a data file/set from a source repository, suitable for transferring to a third party repository.

Figure 2:
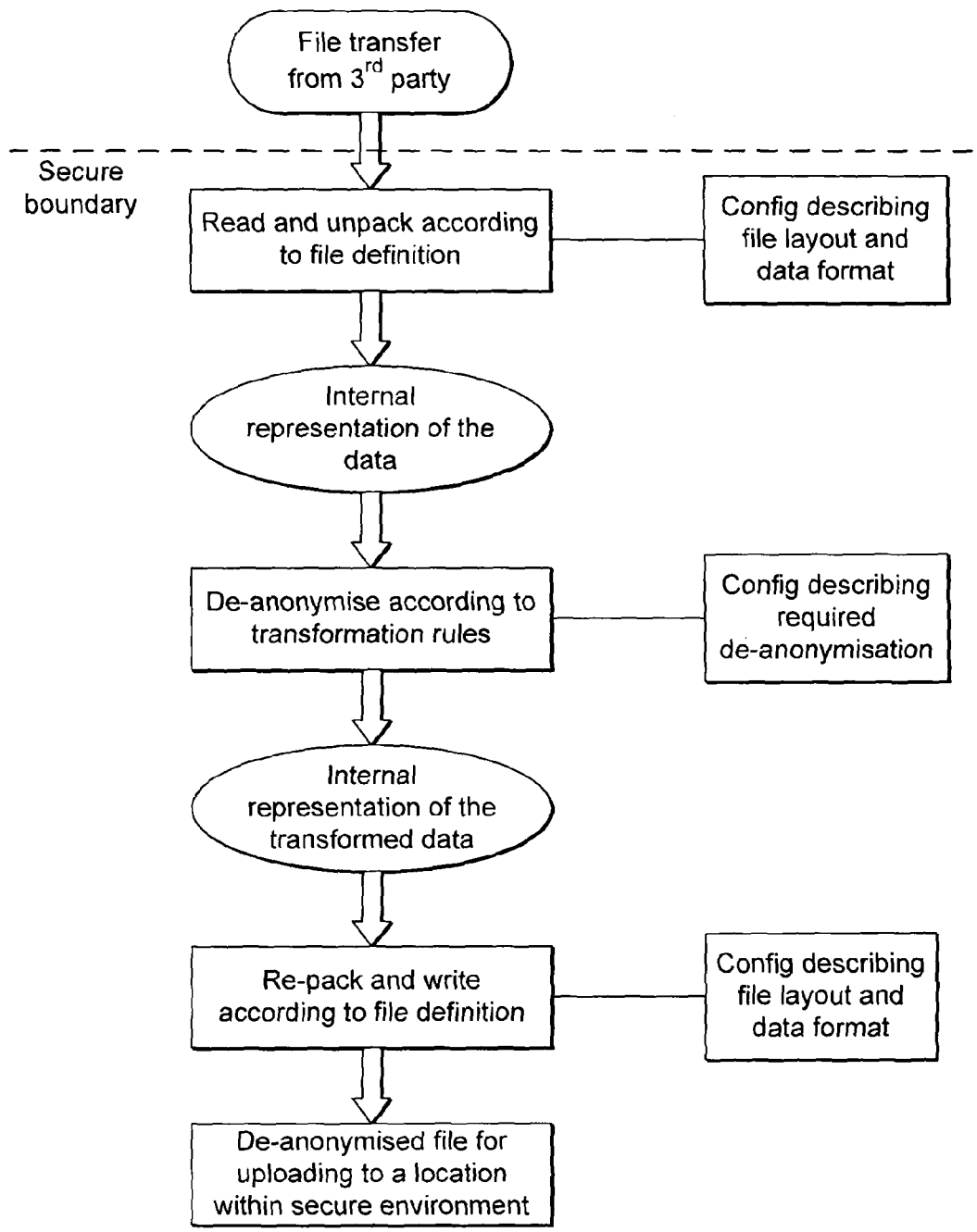
FIG. 2 shows a flow diagram of a method for deanonymising data.

FIG. 2 is s simplified flow diagram of a second embodiment of the anonymising system, illustrating the process of deanonymising a data file received from a third party repository, suitable for uploading back into the source repository.

Example—Source Repository being a Mobile Network Operator. A customer data set for a mobile network customer is stored on a CDR Repository within a secure environment. The customer data set comprises sensitive data items, as shown in use case of FIG. 10, and non-sensitive data items. When the data set is to be sent to a third party outside the secure environment, one or more of the sensitive data items or portions in the customer data set is transformed or anonymised by the anonymisation system according to the rules as predefined for that sensitive data set use case 19 as illustrated in FIG. 10. The anonymised data set is transmitted to the third party. The transmitted anonymised data set comprises both anonymised data items and non-anonymised data items.

The third party then performs processing on the anonymised data set and adds at least one item of data enrichment to the data set. This data enrichment item can be any additional data which is dependant on at least one data item from the anonymised data set. For example the cell-ID, which in use case 19 has not been anonymised, could be used by the third party as an approximate location identifier for the customer. Using this location identifier the third party adds a contextual text message data item to the data set.

The enriched or amended anonymised data set is then transmitted back to the secure environment. The de-anonymisation system then reads the incoming data set, de-anonymises the anonymised data set.

The de-anonymised data set and the contextual text message is transmitted within the secure environment to an SMSC (Short Message Service Center) which uses the de-anonymised data to send the contextual text message to the customer via SMS (Short Message Service).

In the above example, the third party was provided with enough information to allow them to send a targeted message based on location to a customer without having any direct access to the customer, and importantly, without any private and personal information about the customer being transmitted outside of the secure environment. By de-anonymising the sensitive data items when the anonymised data set is returned to the secure environment, the enriched data set can be associated back to the customer and the enriched data can be utilised.

Configuration files used to configure which data items should be anonymised, filtered and/or masked, and the configuration files defining the layout of the transformed data set can be variable. The inbound transformations need not be the same as the outbound transformation.

The described invention is a configurable approach to addressing data security (for example, by anonymising outgoing data) and data privacy (for example, by masking and/or filtering outgoing data).

Figure 3:
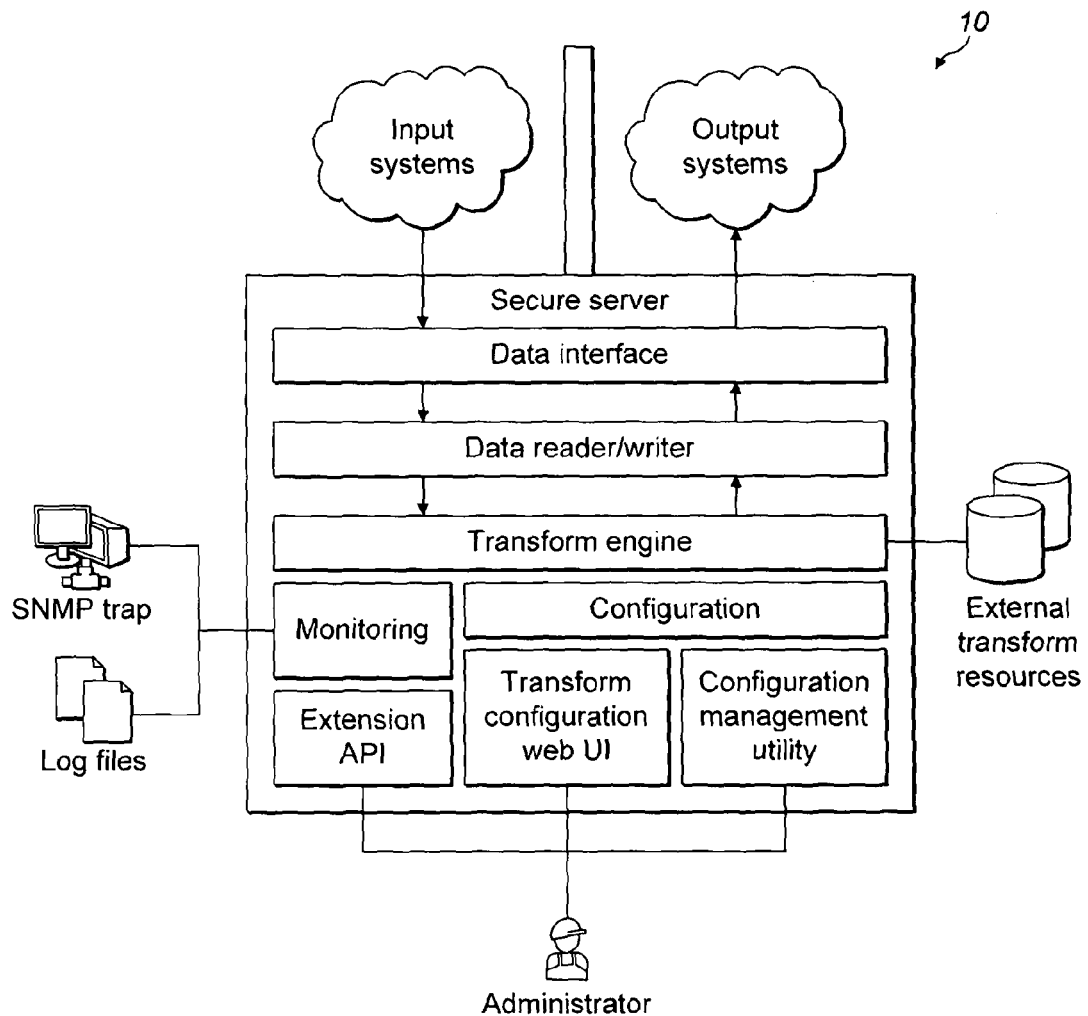
FIG. 3 shows a schematic diagram of a system for performing the methods of FIGS. 1 and 2.

FIG. 3 illustrates schematically the basic internal components, data flows within an anonymisation system 10 and key external interfaces. The "wall" at the top of the diagram represents a security boundary between existing input and output systems which the anonymisation system 10 creates.

An example anonymisation system 10 consists of three logical layers:
Data Interfaces—This layer is responsible for reading and writing data from various raw sources. The data interface passes the data to the Data Reader/Writer layer for processing. The supported interfaces are:
File system
HTTP/HTTPS
TCP/IP
Database
Messaging
Data Readers/Writers—This layer is responsible for parsing a variety of data formats, transforming individual data fields by using the transforms within the Transform Engine, and repackaging the result into the same output format for onward transmission. The supported data formats are:
Delimited
Fixed Width
XML
HTML
YAML
SMPP
UCP
HTTP
SOAP
Transform Engine—This is responsible for transforming individual data fields in a variety of ways, in order to anonymise and de-anonymise them. The supported transforms are as follows:
Filtering
Masking
Ephemeral Encryption/Decryption
Format Preserving Encryption/Decryption*
Hashing*
Find and Replace
Redaction
Validation
Random Number Generation*
Detokenisation*
*Starred transforms are "tokenisable transforms", which means tokenisation can be turned on for them. Tokenising is explained in detail later in the description. The detokenisation transform is used to reverse tokenisable transforms.

The following is a summary of the method carried out by the anonymisation system 10:
The anonymisation system 10 ingests data from an interface;
The data is interpreted into records/fields by a reader/writer;
Fields may be modified by one or more transforms defined in a transformset or transformation configuration resource;
The transformed data is returned into its original or similar format by a reader/writer; and
The anonymisation system 10 transmits the data to its destination via an interface.

A number of transforms which have complex properties, including encryption, are defined via "Transform Schemas". These schemas allow a complex transform to be specified once and then consistently used, possibly many times.

For example, a schema to encrypt a common field, e.g. MSISDN could be used consistently across a number of routes and interfaces to allow consistent encryption and decryption.

A glossary is provided, which explains the technical terms used by this description.

The anonymisation system 10 is preferably multithreaded and can perform many of these actions, at high speed, concurrently.

The anonymisation system 10 is stateless and maintains no history or status of activities performed or in progress. Furthermore, with the exception of tokenisation, it does not store any data. Therefore transactions are atomic. Once an action is complete, the system disregards the action and commences a new one. Should the anonymisation system 10 be interrupted, for example by system failure, then on restart (or by another resilient instance), the entire transaction would need to be repeated. If the system fails while processing data on a file based interface, the file data would remain on the server in an unprocessed state, allowing a system administrator to attempt to reprocess the data later. When using a TCP/IP interface, if the system fails the TCP/IP connection will be terminated and no further data will be processed. Data could then be sent through the system again once it has been restarted.

Variations in format and protocol between input and output may be made. For example, this may include reading from a database and writing to a file.

In one implementation, the anonymisation system 10 is a Java application which can be run on any operating system with a Java Virtual Machine (JVM). The minimum suggested version of Java is 1.6. For production environments, the following Operating Systems are recommended:

Redhat Enterprise Linux 5; and
Debian Squeeze
Example suitable versions are:
Linux RHEL version 5.x
Debian Squeeze version 6
Java JRE Version 1.6
Tomcat Version 7
Jpam (if using the GUI) Version 1.1
Other environments may be used.

An example execution of the anonymisation system 10 may be as follows:

Navigate to the "input" directory and open the "input.csv" file using a text editor. Example input to the system may be as follows:

12345678,Test,447777123456

To inspect the input data to the system and rename the input.csv file to "input.csv.ready". The system picks it up, processes it and writes the output to a new file in an output directory. As shown in this example below, the first field has been masked, the second filtered and the third partially encrypted, i.e.:

"12****78", " ", "448555422322"

Data Interfaces, Data Readers/Writers and Transform Engine provide a flexible framework to receive, transform and output any type of data. These may be configured via a configuration file in XML format. The format for each component within the configuration file is described below.

Configuration files are preferably stored securely in an encrypted and digitally signed form XML Configuration format The data flow through the application may be defined in XML. The high level structure recommended for the XML file is as follows:

Interfaces
Reader/Writers
Transform Sets
Routes

A "Route" defines a data flow or an anonymisation procedure through the system, linking together a Data Interface, a Data Reader/Writer and the relevant set of transforms. The route or anonymisation procedure may be defined by a configurable anonymisation procedure resource. An example configurable anonymisation procedure resource is shown below in XML format:

```
<transform>
    <type>validation</type>
    <field>msisdn</field>
    <properties>
        <regularExpression>[0-9]{15}</regularExpression>
        <actionOnFailure>REPLACE</actionOnFailure>
        <replacementValue>NOT A
        MSISDN</replacementValue>
    </properties>
</transform>
<transform>
    <type>validation</type>
    <field>msisdn</field>
    <properties>
        <regularExpression>[0-9]{15}</regularExpression>
        <actionOnFailure>REPLACE</actionOnFailure>
        <replacementValue>NOT A
        MSISDN</replacementValue>
        <logWarningFlag>false</logWarningFlag>
    </properties>
</transform>
```

Failed Routes

Figure 4:
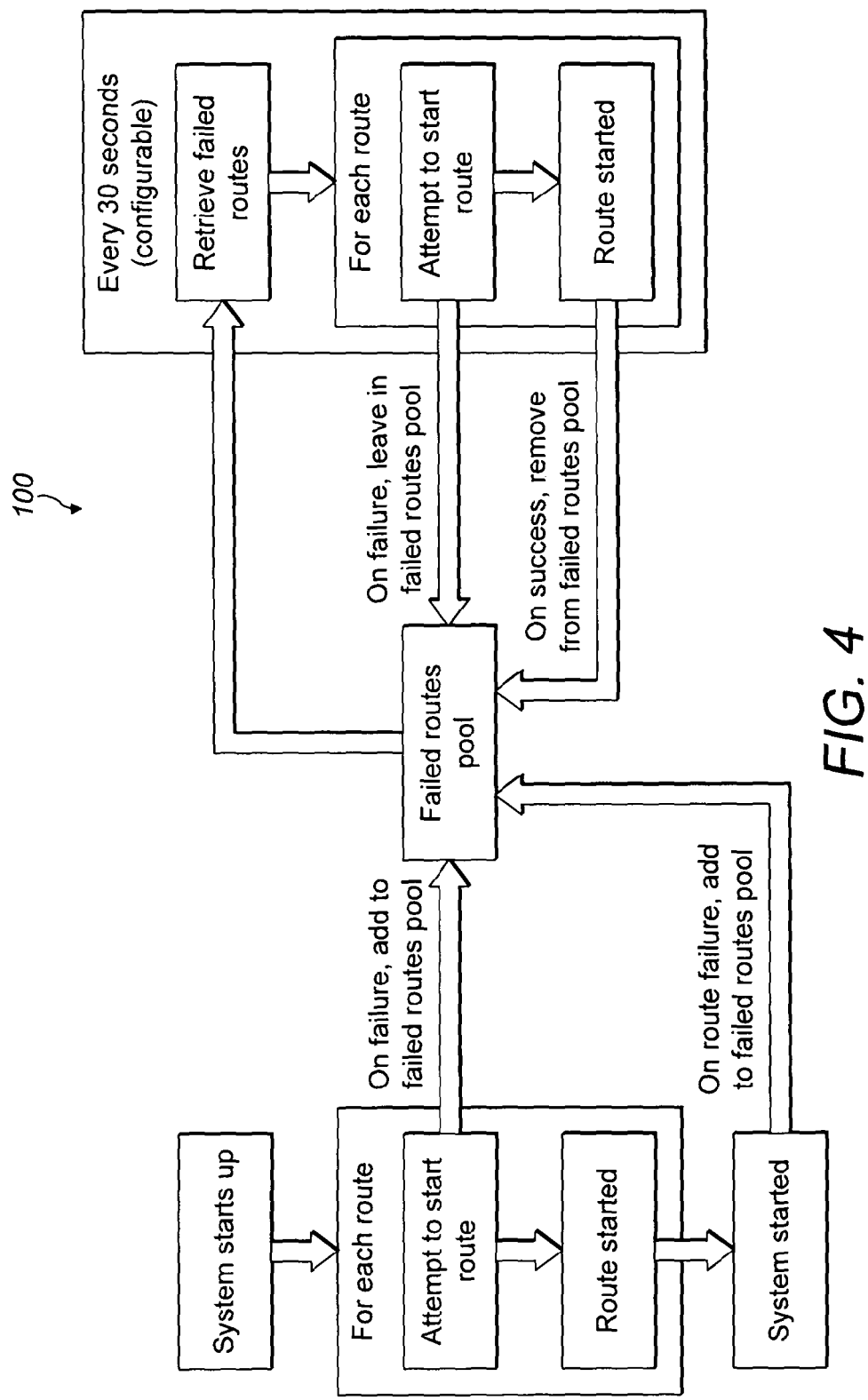
FIG. 4 a flow diagram of a workflow for performing the method of FIG. 1.

If a failure occurs on an interface which means the route either cannot start correctly, or continue to run, it will be moved to a pool of failed routes. A RouteManager thread runs in the background all the time that the anonymisation system 10 is running, and periodically attempts to restart the failed routes. By default, this period is set to every 30 seconds, but this is configurable. FIG. 4 shows schematically the process 100 carried out by a Route Manager.

If a route is successfully restarted, it will be removed from the failed routes pool. If a route fails to restart, it will remain in the failed routes pool until the next time the Route Manager attempts to start the failed routes.

Interface types may be defined in the configuration file and loaded when the anonymisation system 10 is started. New interfaces can be defined using product Extension API.

TABLE 1

| Feature | Description |
| --- | --- |
| File Based | The anonymisation system 10 will read data files from a configurable input directory. Transformed files are written back out to an output directory. |
| HTTP(S) | The anonymisation system 10 listens for HTTP messages on a configurable address. It then forwards transformed messages to an output port. |
| TCP/IP | The anonymisation system 10 can listen for any generic communications over a TCP/IP socket. |
| Database | The anonymisation system 10 can read raw data from a database table and write back to another table. |
| Messaging | The anonymisation system 10 can process messages from a JMS queue and put the result back on another queue or topic. |

The following interfaces may be supported..

File Based The anonymisation system 10 will read data files from a configurable input directory. Transformed files are written back out to an output directory.

HTTP(S) The anonymisation system 10 listens for HTTP messages on a configurable address. It then forwards transformed messages to an output port.

TCP/IP The anonymisation system 10 can listen for any generic communications over a TCP/IP socket.

Database The anonymisation system 10 can read raw data from a database table and write back to another table.

Messaging The anonymisation system 10 can process messages from a JMS queue and put the result back on another queue or topic.

Every interface may have two generic configuration parameters:
  name—The name given to the interface being defined. This is used in the Route to reference the interface
  type—The type of interface being configured.
Possible values (case sensitive) are:
  filesystem
  httpinterface
  tcpipinterface
  databaseinterface
  jms
For example:

```
<interface>
    <name>interfaceName</name>
    <type>interfaceType</type>
    <properties>
        ... Specific properties go here ...
    </properties>
</interface>
```

File System Interface

The file system interface has the following properties available for configuration.
  inputDirectory—The path of the directory to scan for new files
  outputDirectory—The path of the directory to write output files to
  inputSuffix—Optional filter to only process files ending in a certain suffix
  removeInputSuffix—Whether or not to remove the suffix from the incoming file name when it is written to the output
  outputSuffix—Optional suffix to append to the outgoing file once it is fully written. Defaults to .ready
  finishedSuffix—Optional suffix to add to the incoming file once it is fully processed. Defaults to .done
  processingSuffix—Suffix to append to the input and output files which the data is being processed. Defaults to .processing
  pollingFrequency—How often to check the input directory for new files in milliseconds. Defaults to 10000 (10 seconds)

Example Configuration File Section

The following is an example of the section of XML required to define the file system interface.

```
<interface>
    <name>FileInterface</name>
    <type>filesystem</type>
    <properties>
        <inputDirectory>/Data/in</inputDirectory>
        <outputDirectory>/Data/out</outputDirectory>
        <inputSuffix>.xml</inputSuffix>
        <removeInputSuffix>false</removeInputSuffix>
        <processingSuffix>.proc</processingSuffix>
        <outputSuffix>.pickup</outputSuffix>
        <finishedSuffix>.finished</finishedSuffix>
        <pollingFrequency>20000</pollingFrequency>
    </properties>
</interface>
```

This interface will poll every 20 seconds for files in the "/Data/in" directory (relative paths from the location where the anonymisation system 10 was started are allowed, but it is recommended that absolute paths be used to avoid confusion). The interface will pick up any files with the ".xml" suffix, and the resulting output files in "/Data/out" will end with .xml.pickup (since the input suffix is not being removed).

If multiple files with the same file name are inserted into the input directory for processing by the anonymisation system 10 (for example, a second file is inserted after the first file has been processed) there may be collisions when the anonymisation system 10 attempts to rename files.

In order to avoid this, the anonymisation system 10 may attempt to identify filenames that have previously been processed and for which the processed files are still present in the input or output directories.

A unique file name may be assigned to the input file which does not clash with any of the processing or processed files in the input and output directories. Where a collision is found, a number will be appended onto the end of the base file name. For example:
  Supposing using the above configuration a file test.xml is inserted into the input directory.
  This file will be processed by The anonymisation system 10 and will result in a test.xml.finished file in the input directory, and a test.xml.pickup file in the output directory.
  Now if another file called test.xml is dropped into the input directory, the anonymisation system 10 will notice the existing processed files and will rename the file to "test.xml1" before processing.
  The resulting processed files would then be test.xml1.finished and test.xml1.pickup in the input and output directories respectively.

Files appearing in the input directory are created by virtue of an "atomic operation" when ready. This means that a partially written file cannot be picked up by the system.

Error Handling

If an I/O error occurs on the interface (reading and writing files to disk) the route may fail and be moved to the failed routes pool.

HTTP/HTTPS Interface

The HTTP(S) interface listens on a TCP/IP connection for HTTP or HTTPS protocol requests on a configured address. The content portion of the request is considered the data which is interpreted by the Data Readers and transformed accordingly. The interface has the following configurable properties:
  listeningHostname—The interface will listen on this network address. Defaults to "localhost"
  listeningPort—The interface will listen on this network port
  listeningTLS (Transport Layer Security)—whether the anonymisation system 10 server is using HTTPS for this route
  outgoingHostname—The interface will create an outgoing connection to this network address
  outgoingPort—The interface will create an outgoing connection to this network port
  outgoingTLS (Transport Layer Security)—Whether the downstream server is using HTTPS.
  transformType—Specifies which direction the data is to be transformed in. Data can be transformed in the HTTP Request Body, the HTTP Response body, or both. The value of this field must be REQUEST, RESPONSE or REQUESTRESPONSE respectively
  keyProvider—the keyprovider class used for https connections.

For HTTPS, appropriate certificates may be installed in the Java HTTPS keystore.

The following is an example of the section of XML required to define the HTTPS interface.

```
<interface>
        <name>HTTPInterface</name>
        <type>httpinterface</type>
        <properties>
                <outgoingHostname>10.20.0.221
                </outgoingHostname>
                <outgoingPort>6051</outgoingPort>
                <outgoingTLS>true</outgoingTLS>
                <transformType>REQUESTRESPONSE
                </transformType>
                <listeningHostname>localhost</listeningHostname>
                <listeningPort>6050</listeningPort>
                <listeningTLS>true</listeningTLS>
                <keyProvider>keyProvider</keyProvider>
        </properties>
</interface>
```

TCP/IP Interface

The TCP/IP interface listens on a configured address for TCP/IP connections. Once connected, data can be passed and transformed in either direction on the socket. The raw data arriving is passed directly to the Data Reader/Writer for transformation. The interface has the following configurable properties:

listeningHostname
listeningPort
outgoingHostname
outgoingPort

When a connection is established on the specified incoming port, a new Socket will be opened, a new connection will be established to the outgoing address and the corresponding input and output data streams for both directions will be passed down to the Data Reader/Writers. The application will then continue to listen on the specified port. A Reader/Writer of the same data type will be created in each direction. Transforms can be configured to act in either direction.

The following is an example of the section of XML required to define the TCP/IP interface.

```
<interface>
   <name>TCPIPInterface</name>
        <type>tcpipinterface</type>
<properties>
                <outgoingHostname>1.2.3.4</outgoingHostname>
                <outgoingPort>8080</outgoingPort>
                <listeningHostname>localhost</listeningHostname>
                <listeningPort>9201</listeningPort>
        </properties>
</interface>
```

In this case, this interface will listen on port 9201 and make a connection to port 8080 on IP address 1.2.3.4. "localhost" may be used for the outgoing hostname if the destination application is hosted on the same server as The anonymisation system 10.

Database Interface

The database interface reads raw data from a database table and inserts transformed data into another table. The input database table must consist of a primary key column and a data column. The interface has the following configurable properties:

inputDriver—The Java driver class for the input database. (e.g. "com.mysql.jdbc.Driver" for MySql, "oracle.jdbc.driver.OracleDriver" for Oracle). Various database drivers are available for each database implementation.

inputURL: The JDBC URL of the input database server. (e.g. "jdbc:mysql://1.2.3.4").

inputUser: The user name for the input database.

inputPassword: The password for the input database.

inputDBName: The name of the input database schema.

tableName: The database table name to poll for new rows. This must be the same for the input and output databases.

primaryKey: the primary key column of the database.

dataColumn: the data column to transform.

outputDriver: The driver for the output database. (e.g. "com.mysql.jdbc.Driver").

outputURL: The JDBC URL of the output database server. (e.g. "jdbc:mysql://1.2.3.4").

outputUser: The user name for the output database.

outputPassword: The password for the output database.

outputDBName: The name of the output database schema.

The database interface will read all rows in the input table, passing the data from the data column to the reader writer layer for each row. Once the data has been successfully transformed, the transformed data will be written to the output database and the original row from the input database will be deleted.

The following is an example of the section of XML required to define a database interface:

```
<interface>
        <name>databaseInterface</name>
        <type>databaseinterface</type>
        <properties>
                <inputDriver>com.mysql.jdbc.Driver</inputDriver>
                <inputUrl>jdbc:mysql://1.2.3.4:3306</inputUrl>
                <inputUser>user1</inputUser>
                <inputPassword>password</inputPassword>
                <inputDBName>inputSchema</inputDBName>
                <tableName>dataTable</tableName>
                <primaryKey>key</primaryKey>
                <dataColumn>data</dataColumn>
<outputDriver>com.mysql.jdbc.Driver</outputDriver>
                <outputUrl>jdbc:mysql://1.2.3.4:3306</outputUrl>
                <outputUser>user1</outputUser>
                <outputPassword>password</outputPassword>
                <outputDBName>inputSchema</outputDBName>
        </properties>
</interface>
```

Error Handling

If a database connectivity issue occurs, the route may fail and be moved to the failed routes pool (see FIG. 2). If there is a parsing error with any of the data in a row, an error will be logged and the offending row will remain in the input table. When the database is polled again, the anonymisation system 10 will attempt to process the row again.

Messaging Interface

The message interface is used for reading messages from a JMS queue and writing them to another queue or topic.

The configuration parameters are:

brokerUrl—the url of the JMS broker to connect to.

username (optional)—username to use if authentication is required.

password (optional)—password to use if authentication is required.

inputQueue—the name of the queue to listen for messages.

outputDestination—the name of the queue/topic to send messages after transformations have been applied.

outputType (queue/topic)—whether the output destination is a queue or a topic.

errorQueue (optional)—queue to send messages that can't be processed due to an error occurring.

An example XML configuration section for the Messaging Interface is as follows:

```
<interface>
    <name>JMSInterface</name>
    <type>jms</type>
    <properties>
        <brokerUrl>tcp://localhost:61616</brokerUrl>
        <username>secureserve</username>
        <password>password</password>
        <outputType>topic</outputType>
        <inputQueue>input</inputQueue>
        <outputDestination>output</outputDestination>
        <errorQueue>error</errorQueue>
    </properties>
</interface>
```

Reader and Writer Configuration

The data reader/writer configuration consists of a specified data type and a set of fields which are available to be transformed. A field represents a particular piece of information in a specified location in the incoming data stream. For example, if the data type is HTML, a field could be a particular element, defined by its XPath location. The configuration to define where a field is located in the input data is called the "Field Definition". The format of this parameter is described for each reader in this section. The supported data types are listed below.

| Feature | Description |
| --- | --- |
| Fixed Width | The anonymisation system will read standard fixed width format data. |
| Delimited | The anonymisation system will read standard delimited format data, including CSV files. |
| XML | The anonymisation system will interpret simple XML data, where each field is encapsulated within a single tag. |
| HTML | The anonymisation system will interpret simple HTML data, where each field is encapsulated within a single tag. |
| SOAP | The anonymisation system will interpret simple SOAP data, where each field is encapsulated within a single tag. |
| HTTP | The anonymisation system will interpret fields within an HTTP request |
| YAML | The anonymisation system will read YAML object data. |
| SMPP | The anonymisation system will interpret the source and destination address fields of SMPP v3.4 protocol messages. |
| UCP/EMI | The anonymisation system will interpret the address code fields of EMI-UCP v4.3c protocol messages. |

Every reader writer has two generic configuration parameters:

name—The name given to the reader/writer being defined. This is used in the Route to reference the interface type—The type of interface being configured. Valid values (case sensitive) are: fixedwidth, delimited, xml, html, soap, httpreaderwriter, yaml, smpp and ucp The rest of this section describes the specific configurable properties for each reader/writer.

Delimited Reader

The delimited reader will read a stream of delimited data, split it into individual rows and fields, pass fields to the configured transforms and repackage the resulting delimited data stream. The configurable properties for the delimited reader are as follows:

separatorCharacter—The character used to delimit the fields in a row quoteCharacter—The character used to surround each field, which need not be present in. Defaults to "

escapeCharacter—The escape character, used to allow quote characters within fields. Defaults to \ linesToSkip—The number of lines in the header of incoming data. These will be skipped for processing and can be configured to be appended without change to the output. Defaults to 0 copySkipLines—Whether to include skipped header lines in the output. Defaults to true footerLines—The number of lines in the footer of the incoming data. These will be skipped and configured to be appended without change to the output. Defaults to 0 copyFooter—Whether to include the skipped footer data in the output. Defaults to true newline—The newline string to use in the output. Defaults to the standard new line for the operating system on which The anonymisation system 10 is running. For UNIX based systems this is usually a single line feed character and for Windows it is a Carriage return followed by a line feed.

filterField—When performing filter transforms on delimited data, it may be desirable to include a blank field in the output instead of removing the field completely, in order to preserve the number of columns in the output data. This parameter specifies whether filtered fields will be completely removed from the outgoing data or whether blank fields will be included in their place. Defaults to false, meaning that a filtered field will be included as a blank value in the output.

The "Field Definition" for delimited data is the 0-based index which corresponds to the field in the incoming data. Optionally, the fields may be reordered, in which case the field definition should be a comma separated pair of the initial index and the desired output index.

An example of the XML section to configure the delimited reader is as follows:

```
<reader>
    <name>ThreeXFormReader</name>
    <type>delimited</type>
    <properties>
        <separatorCharacter>,</separatorCharacter>
        <quoteCharacter>"</quoteCharacter>
        <filterField>true</filterField>
    </properties>
    <fields>
        <field>
            <name>field1</name>
            <definition>0</definition>
        </field>
        <field>
            <name>field2</name>
            <definition>1</definition>
        </field>
        <field>
            <name>field3</name>
            <definition>2</definition>
        </field>
    </fields>
</reader>
```

Fixed Width Reader

The Fixed Width Reader is responsible for reading lines of fixed width data. The configurable properties for the fixed width reader are:

linesToSkip—The number of lines in the header of incoming data. These will be skipped for processing and can be configured to be appended without change to the output. Defaults to 0 copySkipLines—Whether to include skipped header lines in the output. Defaults to true. Must be true or false footerLines—The number of lines in the footer of the incoming data. These will be skipped and configured to be appended without change to the output. Defaults to 0 copyFooter—Whether to include the skipped footer data in the output. Defaults to true. Must be true or false newline—The newline string to use in the output. Defaults to the standard new line for the operating system on which the anonymisation system 10 is running.

fixedFormat—Whether to enforce the same width fields on the outgoing data stream as the input. This means that any fields shorter than the input field after transformation will be padded with trailing spaces. Defaults to true. It is invalid to configure a transform which will produce a field of a greater length than the input, e.g. Ephemeral Encryption.

The Field Definition for Fixed Width data is a comma separated pair of their start position within the line (0 based) and the length of the field. Only the fields that are to be transformed need to be specified, the reader will copy all unspecified fields untransformed.

An example of the XML section to configure the fixed width reader is as follows:

```
<reader>
    <name>FixedWidthReader</name>
    <type>fixedWidth</type>
    <properties>
        <linesToSkip>0</linesToSkip>
        <fixedFormat>true</fixedFormat>
    </properties>
    <fields>
        <field>
            <name>field1</name>
            <definition>0,5</definition>
        </field>
        <field>
            <name>field2</name>
            <definition>5,4</definition>
        </field>
        <field>
            <name>field3</name>
            <definition>9,10</definition>
        </field>
    </fields>
</reader>
```

If fixedFormat is specified, and the transformed length is less than the length of the original field, the transformed field will be padded with spaces.

If fixedFormat is specified, and the transformed length is greater than the length of the original field, an error will be thrown.

If fixedFormat is set to false, the output will be a concatenation of all the fields after they have been transformed.

XML

An XML reader is responsible for reading XML data and extracting fields to transform based on XPath expressions. XPath can be used to define specific elements or attributes to be transformed, these are collectively known as nodes. A configurable property for the XML reader is:

filterNode—Where a field is filtered using the filter transform, this field defines whether to completely remove the filtered node from the output XML or just to set the value of the node to be blank Fields are configured by an XPath expression. All nodes matching the expression belong to the same field. The text content of the node is the field value which will be transformed.

An example of the XML configuration for the XML reader is as follows (See section 2.9 for a full configuration file example):

```
<reader>
    <name>XMLReader</name>
    <type>xml</type>
    <fields>
        <field>
            <name>title</name>
            <definition>/book/title</definition>
        </field>
        <field>
            <name>author</name>
            <definition>/book/author</definition>
        </field>
        <field>
            <name>description </name>
            <definition>/book/descr</definition>
        </field>
    </fields>
</reader>
```

For example, the following HTML data could be used as input to this reader:

```
<book>
    <title>Title</title>
    <author>Author</author>
    <descr>Description</descr>
</book>
```

In this case, the values "Title", "Author", "Description" would be picked up for transformation by the fields "title", "author", "description" in the configuration file. For example, if the destination system is dependent on the value of a specific element, the transform should not be configured to set the value of this element to an invalid value.

HTML

An HTML reader is responsible for reading HTML data and extracting fields to transform based on XPath expressions.

The configurable property for the HTML reader is:

filterNode—Where a field is filtered using the filter transform, this field defines whether to completely remove the filtered node from the output HTML or just to set the value of the node to be blank Fields are configured by an XPath expression. All nodes matching the expression belong to the same field. The text content of the node is the field value which will be transformed. An example of the XML configuration for the HTML reader is as follows:

```
<reader>
    <name>HTMLReader</name>
    <type>html</type>
    <fields>
        <field>
            <name>field1</name>
            <definition>/html/body/h1</definition>
        </field>
        <field>
            <name>field2</name>
            <definition>/html/body/h2</definition>
        </field>
        <field>
            <name>field3</name>
            <definition>/html/body/h3</definition>
        </field>
    </fields>
</reader>
```

For example, the following HTML data could be used as input to this reader:

```
<html>
    <body>
        <h1>Heading 1</h1>
        <h2>Heading 2</h2>
        <h3>Heading 3</h3>
    </body>
</html>
```

In this case, the values "Heading 1", "Heading 2", "Heading 3" would be picked up for transformation by the fields "field1", "field2", "field3" in the configuration file.

SOAP

The SOAP reader is responsible for reading SOAP data and extracting fields to transform based on XPath expressions. XPath can be used to define specific elements or attributes to be transformed; these are collectively known as nodes. The configurable property for the SOAP reader is:

filterNode—Where a field is filtered using the filter transform, this field defines whether to completely remove the filtered node from the output SOAP data or just to set the value of the node to be blank Fields are configured by an XPath expression. All nodes matching the expression belong to the same field. The text content of the node is the field value which will be transformed.

An example of the XML configuration for the SOAP reader is as follows:

```
<reader>
    <name>SOAPReader</name>
    <type>soap</type>
    <fields>
        <field>
            <name>title</name>
            <definition>/book/title</definition>
        </field>
        <field>
            <name>author</name>
            <definition>/book/author</definition>
        </field>
        <field>
            <name>description </name>
            <definition>/book/descr</definition>
        </field>
    </fields>
</reader>
```

HTTP

The HTTP reader/writer is responsible for extracting and transforming data from within an HTTP request body, and extracting and transforming HTML elements using XPath in the HTTP response. There are no configurable properties for the HTTP reader.

An example XML configuration for the HTTP reader is as follows:

```
<reader>
    <name>HTTPReader</name>
    <type>httpReaderWriter</type>
    <fields>
        <field>
            <name>msisdn</name>
            <definition>msisdn</definition>
        </field>
        <field>
            <name>HTMLHeader1</name>
            <definition>/html/body/div/span[@id='original']</definition>
        </field>
    </fields>
</reader>
```

This data reader/writer is effectively a composite reader which processes HTTP request data on the outbound path, and delegates to the HTML reader to transform HTML data on the HTTP response. The field definition consists of the name of the field in the case of a request, and an XPath expression in the case of the response. In order to define which direction a transform is applicable to, a property <direction> must be set within the transform configuration. This value must be set to either OUTBOUND or INBOUND, for request and response respectively.

The following is an example of the transform set configuration for use with the reader definition above

```
<transformSet>
    <name>HTTPTransform</name>
    <transforms>
        <transform>
            <type>encrypt</type>
            <field> msisdn </field>
            <direction>OUTBOUND</direction>
            <properties>
                <schema>smokeencrypt</schema>
            </properties>
        </transform>
        <transform>
            <type>decrypt</type>
            <field>HTMLHeader1</field>
            <direction>INBOUND</direction>
            <properties>
                <schema>smokeencrypt</schema>
            </properties>
        </transform>
    </transforms>
</transformSet>
```

YAML

The YAML reader is responsible for extracting and transforming data from a YAML data stream. There are no configurable properties for the YAML reader.

An example XML configuration for the YAML reader is as follows:

```
<reader>
    <name>tgwyamlreader1</name>
    <type>yaml</type>
    <fields>
        <field>
            <name>field1</name>
            <definition>receipt</definition>
        </field>
        <field>
            <name>field2</name>
            <definition>customer.name</definition>
        </field>
        <field>
            <name>field3</name>
            <definition>items.{part_no}</definition>
        </field>
    </fields>
</reader>
```

Object-Graph Navigation Language (OGNL) is used as the expression language to choose fields of data from a YAML object map.

It is possible to specify a particular field in a list using square brackets e.g. items[1].descrip. This would correspond to the descrip field of the object at index 1 (zero-based) in the items list. If the specified indexed item does not exist then a warning will be logged to state that the system was unable to transform this field definition as it does not exist and the application would continue.

SMPP Protocol

SMPP Protocol v3.4 messages can be accepted as a data type as per the specification [5]. This includes long SMS messages. The following messages are available for transformation:

submit_sm
deliver_sm
query_sm
cancel_sm
replace_sm
data_sm
submit_multi

In these messages only the following fields are available for transformation (where available):

source_addr
destination_addr

All other messages will be sent through the filter unaffected.

An example SMPP reader configuration XML fragment is as follows:

```
<reader>
    <name>smpp-data</name>
    <type>smpp</type>
    <fields>
        <field>
            <name>submit_dest</name>
            <definition>submit_sm/destination_addr</definition>
        </field>
    </fields>
</reader>
```

Fields are configured by a slash separated pair of message type and field name, both according to the SMPP specification.

UCP Reader

The UCP Reader will read messages according to the UCP-EMI specification v4.3c [6]. The following Message Types are supported:

Call Input Operation
SMT Alert Operation

All other Message Types will pass through the filter unaffected.

The following fields are available for transform in the outgoing message and response:

AdC
OAdC (Call Input Operation only)

There are no configurable properties for the UCP reader.

An example XML configuration fragment for the UCP Reader is as follows:

```
<reader>
    <name>ucp-data</name>
    <type>ucp</type>
    <fields>
        <field>
            <name>call_input_adc</name>
            <definition>CallInputOperation/Operation/adc</definition>
        </field>
    </fields>
</reader>
```

Fields to transform are configured by a slash separated list of message type, message operation and field name. Message type must be one of CallInputOperation or SMTAlert. Please see the UCP specification [6] for details of each message type. Message direction must be either Operation or Result and field name must be either adc or oadc.

Transform Configuration

Transforms are configured in the XML file by mapping specific fields (defined by the reader/writers) to a transform type, and specifying any required properties for the transform. Multiple transforms can be applied to a single field.

The available transforms are described in the following table, and this section details the functionality and configuration parameters for each transform. Some transforms are "tokenisable", meaning that the generated values will be stored against the input values in a token store, for future lookup. See below in table 2 for more information on tokenisation.

TABLE 2

| Feature | Description | Tokenisable |
| --- | --- | --- |
| Masking | All or part of the field value can be masked with a chosen masking character. | |
| Encryption | A field value can be encrypted using a configurable encryption algorithm including industry standard AES encryption. | Yes |
| Decryption | An encrypted field value can be decrypted to plain text with a configurable algorithm including industry standard AES encryption. | |
| Filtering | Fields can be completely removed from the output, so they cannot be reconstructed or retrieved in any way by the destination system. | |
| Hashing | A field can be hashed by way of a keyed hash function using a secret key located in the application key store. | Yes |
| Find and Replace | Part of a field can be replaced with another value. Several pairs of values to find and replace can be specified. | |
| Redaction | Part of a field can be removed from the output (effectively find and replace, replacing with nothing). The part which is removed will be unrecoverable by the destination system, in a similar way to filtering | |
| Validation | A field can be checked against a regular expression, with various options for what to do if the field does not match. | |
| Random Number Generation | Generates a random number, irrespective of the value of the input field. Intended to be used only with tokenisation enabled. | Yes |
| Detokenisation | Original input values can be restored by looking up a token in a token store. | Yes |

Tokenisation

Tokenisation enables the output of certain transforms to be stored in a token store along with the input value which generated them. In other words, transformed fields are recoverable. The token value may be derivable from the input or original value (e.g. by an encryption or other function) or may be unconnected. The tokenisation process follows these steps:

Check whether the input value exists in the token store.

If so, return the corresponding token

If not, run the underlying transform (any described in table 2 as being tokenisable, for example) and add the result to the token store.

The anonymisation system 10 application comes with a Database token or repository store. The transforms that support tokenisation are:
Encryption
Hashing
Random number generation To reverse the tokenisation process, a detokenisation transform can be used. This is effectively a tokenisable transform which doesn't have an implementation of how to transform data, and assumes that the token is present for every value received.

Transform Configuration Format

Transforms are configured as entries in a transform set, which is defined in XML using the <transformSet> tag. A transformSet is defined by the following configuration parameter:

name—The name to use for this transformSet, which the Route will use to reference it The following is an example configuration of a transform set:

```
<transformSet>
    <name>anonymise</name>
    <transforms>
        <transform>
            <type>encrypt</type>
            <field>field1</field>
            <properties>
                <schema>fpe</schema>
            </properties>
        </transform>
    </transforms>
</transformSet>
```

The following configuration parameters may be present for every transform:
field—The name given to the field in the reader/writer configuration to apply the transform to
type—The type of transform being configured. Valid values (case sensitive) are filter, mask, encrypt, decrypt, hash, findAndReplace, redaction, randomNumberGen, validation, detokenisation Additionally, the following two properties are optional for every transform:
sensitiveInput—Whether the input value must be masked in log files. Defaults to true
sensitiveOutput—Whether the output value must be masked in log files. Defaults to false The rest of this section defines the configurable properties for each transform type. Some of the properties may refer to transform schemas, which are more complicated sections of XML, rather than just a plain value. The use of properties to refer to schemas is documented specifically for each transform type. See the full configuration file at the end of the section for a full example.

Filter Transform

The filter transform removes a field from the data. This may mean removing the field entirely, or just removing the field's value, depending on the data type. Example behaviour is defined in the following paragraph.

The exact process for filtering is dependent on the specific data reader/writer, as follows:
Delimited data—The reader can be configured to either completely remove the field or set the field to be a blank value
Fixed width data—The field will be set to a blank value
XML/HTML—The reader can be configured to set filtered nodes values to be blank, or to remove the entire node
UCP—The field will be set to be a blank value
SMPP—The field will be set to be a blank value
Note: This transform is one way and not reversible. A filtered value cannot be reinstated.

An example of the XML required to configure the filter transform is as follows:

```
<transform>
    <type>filter</type>
    <field>field1</field>
</transform>
```

Masking Transform

This transform replaces a subset of characters within a field with a specified character.

The configurable properties available for the masking transform are:
anchor—Used to define a substring to mask. Whether to work from the beginning or end of the input value when applying the offset and numberMasked properties. If specified, this must be START or END. Defaults to START
offset—The number of characters from the anchor to skip before masking starts. Defaults to 0. For example, if masking using the # character with an anchor of start an offset of 1 and a numberMasked of 4, "Hello" would become "H####".
numberMasked—the number of characters to mask from the offset
character—the character to use as a mask. Defaults to *

For example, if character=*, Anchor=START, Offset=2 and numberMasked=4:
"Hello" would become "He***".
"SecureServe" would become "Se****Serve".

An example of the XML required to configure this transform is as follows:

```
<transform>
    <type>mask</type>
    <field>MsisdnA</field>
    <properties>
        <anchor>START</anchor>
        <numberMasked>4</numberMasked>
        <offset>2</offset>
        <character>*</character>
    </properties>
</transform>
```

This example will mask the 3rd-6th characters in the input (if present) with a series of * characters.

Encryption and Decryption

The encryption transform will encrypt the data using a defined encryption schema. The available encryption schemas are loaded at system start up from configuration. Encryption keys to be used by these transforms need to be added to the application keystore using the Configuration Management Utility. Without a valid encryption key defined in the application keystore, these transforms cannot be used.

Two example types of encryption are described:
Ephemeral—The same input value will produce different encrypted values when encrypted twice with the same encryption key, however, any result can be decrypted to the original value. For example:
"12345" could encrypt to "X13f9s3gGsGh25DB" on the first attempt and "IR3d2xSggs9DssH3" on the second time. Both of these values would decrypt to "12345".

Format Preserving—An input value will always transform to the same ciphertext when encrypted using the same encryption key. The ciphertext will be of the same length and the same alphabet as the input value, specified by the encryption schema configuration. For example:

"12345" could encrypt to "98627". "67890" could encrypt to "46602". Then "98627" would decrypt back to "12345" and "46602" would decrypt to "67890".

Optionally, only a substring can be encrypted using an anchor/offset mechanism in a similar way to the masking transform An encryption schema may be specified in the XML configuration file in order for an encryption or decryption transform to be configured.

An encryption schema is defined by the following parameters:

name—a user defined name for the schema key—the cryptographic key alias to use. This must have been defined in the application keystore using the configuration management utility type—the type of encryption. EPHEMERAL or FPE (Format Preserving Encryption)

alphabet (Format preserving only)—The valid range of input/output characters as a string. E.g. "0123456789" for numerical values. Special characters can be defined using XML escape sequences e.g. & for &.

anchor (Format preserving only)—Used to define a substring to encrypt. Whether to work from the beginning or end of the input value when applying the offset and encryptionLength properties. If specified, must be START or END. Defaults to START offset (Format preserving only)—The number of characters from the anchor to skip before encryption starts. Defaults to 0.

encryptionLength (Format preserving only)—The number of characters from the offset to encrypt Examples of configuration for both types of schema are as follows:

```
<encryptionSchema>
    <name>ephemeral</name>
    <key>mykey</key>
    <type>EPHEMERAL</type>
</encryptionSchema>
<encryptionSchema>
    <name>fpe</name>
    <key>fpekey</key>
    <type>FPE</type>
    <alphabet>0123456789</alphabet>
    <anchor>START</anchor>
    <offset>2</offset>
    <encryptionLength>20</encryptionLength>
</encryptionSchema>
```

In the above Format Preserving Encryption example, characters 3-22 will be encrypted (if present).

Transform Configuration

The encryption and decryption transforms are configured by the following property:

schema—a reference by name to an "Encryption schema", which must be defined elsewhere in the configuration file.

tokenisationSchema (encryption only)—The tokenisation schema to use, if tokenisation is to be enabled. If this parameter is left out, no tokenisation will be used.

Example Transform Configuration

An example of the XML configuration for encryption and decryption transforms are as follows:

```
<transform>
    <type>encrypt</type>
    <field>field1</field>
    <properties>
        <schema>fpe</schema>
    </properties>
</transform>
<transform>
    <type>decrypt</type>
    <field>field1</field>
    <properties>
        <schema>fpe</schema>
    </properties>
</transform>
```

Hashing Transform

The hashing transform uses an algorithm with a secret key to create a hash of the supplied value. The secret key may be kept in the application key store and referred to in the same way as an encryption key. This key needs to be added to the application keystore using a Configuration Management Utility in the same way as encryption keys. Without a valid key defined in the application keystore, this transform cannot be used.

The configuration parameters for the hashing transform are:

keyProvider—This defines the key store to use. This should be set to "keyProvider" to use the application key store. This has been included as a configuration parameter for extra configurability in future, but for this release should always be set to "keyProvider"

keyAlias—The alias of the key in the application key store to use tokenisationSchema—The tokenisation schema to use, if tokenisation is to be enabled. If this parameter is left out, no tokenisation will be used.

An example configuration XML segment for the hashing transform is as follows:

```
<transform>
    <type>hash</type>
    <field>field1</field>
    <properties>
        <keyProvider>keyProvider</keyProvider>
        <keyAlias>hashKey</keyAlias>
    </properties>
</transform>
```

Find and Replace Transform

The Find and Replace Transform will replace any instances of defined strings within a field with another value. The value to find may optionally be a regular expression. The configuration parameters for the find and replace transform are as follows:

schema—a reference by name to a "Find and replace schema" which must be defined elsewhere in the configuration file Find and Replace Schema Definition A Find and Replace schema is defined by a name and a list of pairs of find and replace values. Each entry may have the following configuration parameters:

find—the value to find replace—the value to replace matching values with regex—whether the value to find is a regular expression (defaults to false). The example below uses the regular expression [a-z]{5}, which means it will match 5 consecutive lowercase characters. Please see the glossary entry on regular expressions for more details.

casesensitive—whether the value to find should be case sensitive (defaults to false)

An example find and replace schema is as follows:

```
<findAndReplaceSchema>
    <name>mySchema</name>
    <propertyList>
        <entry>
            <find>a</find>
            <replace>b</replace>
        </entry>
        <entry>
            <find>b</find>
            <replace>c</replace>
            <casesensitive>true</casesensitive>
        </entry>
        <entry>
            <find>[a-z]{5}</find>
            <replace>###</replace>
            <regex>true</regex>
            <casesensitive>true</casesensitive>
        </entry>
    </propertyList>
</findAndReplaceSchema>
```

Example Transform Configuration

An example for the configuration of a find and replace transform using a defined schema is as follows:

```
<transform>
    <type>findAndReplace</type>
    <field>field1</field>
    <properties>
        <schema>mySchema</schema>
    </properties>
</transform>
```

The list of values to find and replace are applied in the order defined in the configuration file, the output of each being used as the input of the next.

Redaction Transform

The Redaction Transform will remove any instances of defined strings. No padding with spaces or replacing with "black blocks" will be performed. If any form of padding is required, the Find and Replace transform can be used, setting the replace value to a string of spaces or another appropriate character. The configuration parameters for the redaction transform are as follows:

schema—a reference by name to a "Redaction schema" which must be defined elsewhere in the configuration file Redaction Schema Definition A Redaction schema is defined by a name and a list of values to remove. Each entry may have the following configuration parameter:

redact—the value to remove

An example redaction schema is as follows:

```
<redactionSchema>
    <name>mySchema</name>
    <propertyList>
        <entry>
            <redact>a</redact>
        </entry>
        <entry>
            <redact>b</redact>
        </entry>
    </propertyList>
</redactionSchema>
```

Example Transform Configuration

An example for the configuration of a redaction transform using a defined schema is as follows:

```
<transform>
    <type>redaction</type>
    <field>field1</field>
    <properties>
        <schema>mySchema</schema>
    </properties>
</transform>
```

Random Number Generation Transform

The Random Number Generation Transform takes a String value as input and returns a random number generated using the a randomising algorithm between specified upper and lower bounds. The application's built in secure random number generator will be used to generate the random numbers. Note that this transform is not dependent on the input value and is intended for use only with tokenisation enabled. The following configuration parameters are available for this transform:

lowerBound—The inclusive lower limit for the random number generator. i.e. the value generated will be greater than or equal to this value upperBound—The exclusive upper limit for the random number generator. i.e. the value generated will be less than or equal to this value.

tokenisationSchema—The tokenisation schema to use, if tokenisation is to be enabled. If this parameter is left out, no tokenisation will be used.

An example configuration XML segment for this transform is as follows:

```
<transform>
    <type>randomNumberGen</type>
    <field>field9</field>
    <properties>
        <lowerBound>100</lowerBound>
        <upperBound>200</upperBound>
        <tokenisationSchema>mySchema</tokenisationSchema>
    </properties>
</transform>
```

Validation Transform

The validation transform checks the input value against a regular expression. If it matches the value will pass through the transform unchanged. If it doesn't match it can either be removed, replaced with another value, or pass through anyway (with a warning logged). The action to perform on validation failure is defined by the configuration parameters. The configuration parameters for this transform are as follows:

regularExpression—the regular expression to check the input value against actionOnFailure—the action to take if validation is unsuccessful. Must be one of:

DONOTHING—the value will pass through the transform anyway

FILTER—the value will be filtered (using the same rules as the filter transform)

REPLACE—the value will be replaced by the value defined in the "replacementValue" property replacementValue—the value to be used as a replacement, if the actionOnFailure parameter is set to REPLACE logWarningFlag—whether a warning message should be logged when a field fails validation. Defaults to false An example of the XML configuration required for this transform is as follows:

```
<transform>
    <type>validation</type>
    <field>msisdn</field>
    <properties>
    <regularExpression>[0-9]{15}</regularExpression>
        <actionOnFailure>REPLACE</actionOnFailure>
        <replacementValue>NOT A MSISDN</replacementValue>
        <logWarningFlag>true</logWarningFlag>
    </properties>
</transform>
```

Detokenisation Transform

The detokenisation transform is used to look up previously defined values in a token store. It is intended to be used as the reverse of one of the other tokenisable transforms (encryption, hashing, random number generation) with tokenisation enabled. It does not have any functionality as a standalone transform. The only configuration parameter is:

tokenisationSchema—The tokenisation schema to use. This is mandatory for detokenisation. If not present the transform will fail to start. Please note that the "keyColumn" and "tokenColumn" of the tokenisation schema should be reversed for the detokenisation transform. i.e. the "keyColumn" should be the column containing previously generated tokens, and the "tokenColumn" should be the column containing the original input values.

An example of the configuration for this transform is as follows:

```
<transform>
    <type>detokenisation</type>
    <field>field1</field>
    <properties>
        <tokenisationSchema>myTokenisationSchema
        </tokenisationSchema>
    </properties>
</transform>
```

Tokenisable Transform Configuration

Any transform for which tokenisation is available (encryption, hashing, random number generation) must specify a tokenisation schema to use. This schema specifies the type of tokenisation and the configuration parameters for that specific type of tokenisation. The anonymisation system 10 comes with database tokenisation built in, and provides a Java API for a custom token store to be written.

The existence of the tokenisation database is a prerequisite when turning on tokenisation for any tokenisable transform.

If tokenisation is enabled on a transform, the token store may be checked every time the transform is invoked using the following process:

The input value may be looked up in the token store.

If the input value is already present in the token store (i.e. it has been through the system already and a token generated) then the token from the token store will be used without running the transform logic.

If the input value is not present in the token store, the transform will be run and the resulting value stored in the token store.

A tokenisation schema is specified by a name, the type of tokenisation and a list of tokenisation properties, specific to the type of tokenisation being used. This section describes how to use the built in database token store.

To use the built in database token store, a database table may be used, which has two String based columns (e.g. VARCHAR), each of which must have unique constraints. There may be other columns in the table, but they must all have default values.

Tokenisation configuration parameters for the database token store may be:

driver—The class of the JDBC driver to use url—the fully qualified JDBC url to the database, including the database schema name username—the username to connect to the database password—the corresponding password table—the name of the table to use to store tokens keyColumn—the column to use to store input values tokenColumn—the column to use to store tokens An example of the XML required to configure a tokenisation schema is as follows:

```
<tokenisationSchema>
    <name>myTokenisationSchema</name>
    <type>DATABASE</type>
    <tokenisationProperties>
        <driver>com.mysql.jdbc.Driver</driver>
        <url>jdbc:mysql://localhost:3306/test</url>
        <username>root</username>
        <password>password</password>
        <table>tokens</table>
        <keyColumn>input</keyColumn>
        <tokenColumn>token</tokenColumn>
    </tokenisationProperties>
</tokenisationSchema>
```

Please note. It may be desirable to populate the token store manually before starting the anonymisation system 10, for example so the tokens do not have to be generated but are already present when the system is started.

Validation Rules and Standardisation

Standardisation and simple format fixing can be achieved by using a combination of validation, find and replace and redaction transforms. For example, the following specific fields could be standardised as follows:

MSISDN

A Validation transform to check character range, type and MSISDN length

A Find and Replace transform configured to replace +44 with 0

A Redaction transform to remove whitespace IMEI

A Validation transform to check character range, type and IMEI length (15 or 16 digits)

A Redaction transform to remove "-", and whitespace.

ICCID

A Validation transform to check character range, type and ICCID length (19 or 20 digits)

A Redaction transform to remove whitespace

IMSI

A Validation transform to check character range, type and IMSI length (14 or 15 digits)

A Redaction transform to remove whitespace IP Address

A Validation transform to check IP address format i.e.

IPV4: nnn.nnn.nnn.nnn
IPV6: hhhh:hhhh:hhhh:hhhh:hhhh:hhhh:hhhh:hhhh
IPV6: hhhh-hhhh-hhhh-hhhh-hhhh-hhhh-hhhh-hhhh
A Redaction transform to remove whitespace
Route Configuration How the data flows through the system may be configured (i.e. workflows). These are known as routes, and are configured preferably in the XML file using the following parameters:

- interface—The data interface for this route, identified by the name field in the interface configuration
- reader—The data reader/writer for this route, identified by the name field in the reader/writer configuration
- transformSet—Identified by the name field within the transform set configuration. Exactly one transform set must be applied to a single route, but the same transform set can be shared across multiple routes.
- maxConcurrentReaders (optional)—The maximum number of threads to use to launch Data Reader/Writers within this route. Specifically, each interface uses the maxConcurrentReaders property as follows:

File Interface—The number of threads which can process files concurrently

HTTP—The maximum number of HTTP requests which can be processed simultaneously. Optimally, this should be set to the maximum number of expected concurrent requests.

TCP/IP—The number of threads which can process data from TCP/IP connections at once. Note that one thread per TCP/IP connection will be used, so this should be set to the maximum number of expected connections via this interface.

Messaging—The number of threads which will concurrently listen to the input queue.

Database—The number of threads which can process database data at once.

The following is an example of the XML configuration required for a Route:

```
<route>
    <interface>file-feed</interface>
    <reader>delimited-data</reader>
    <transformSet>anonymise</transformSet>
    <maxConcurrentReaders>4</maxConcurrentReaders>
</route>
```

Example Configuration File

The following is an example of a complete configuration file, specifying the following components:

- A startup section informing the application of the namespaces in use by the XML file. This should be set to the value given in the below example.
- a file based interface, reading files with the .ready suffix from the /input directory, writing the result to the /output directory with no suffix and renaming the processed file in the input directory to end with a .done suffix.
- a delimited reader, using a comma as a delimiter and specifying 3 fields.
- the following transforms Format preserving encryption, encrypting up to 20 characters from an offset of 2 from the beginning, using the alphabet 0123456789

Filter—the second field is removed

Mask, masking up to 4 characters with a #, with an offset of 2 from the start

It is possible to split the configuration across multiple configuration files, for example all interfaces could be defined in one file, all readers in another, and so on. Alternatively, all components related to each route could be defined in separate files.

Please note that the reference to URLs at the top of the configuration file is specifying various XML namespaces required by some of the application libraries. No internet connection is required to run the anonymisation system 10.

```
<?xml version="1.0" encoding="UTF-8"?>
<beans:beans
xmlns:beans=http://www.springframework.org/schema/beans
xmlns:xsi="http://www.w3.org/2001/XMLSchema-instance"
xmlns="http://www.detica.com/ddsf/configuration"
    xsi:schemaLocation="http://www.springframework.org/schema/beans
http://www.springframework.org/schema/beans/spring-beans-3.0.xsd">
    <interface>
        <name>file-feed</name>
        <type>filesystem</type>
        <properties>
            <inputDirectory>/input</inputDirectory>
            <outputDirectory>/output</outputDirectory>
            <pollingFrequency>5000</pollingFrequency>
            <inputSuffix>.ready</inputSuffix>
            <removeInputSuffix>true</removeInputSuffix>
            <processingSuffix>.working</processingSuffix>
            <finishedSuffix>.done</finishedSuffix>
        </properties>
    </interface>
    <reader>
        <name>delimited-data</name>
        <type>delimited</type>
        <properties>
            <separatorCharacter>,</separatorCharacter>
        </properties>
        <fields>
            <field>
                <name>field1</name>
                <definition>0</definition>
            </field>
            <field>
                <name>field2</name>
                <definition>1</definition>
            </field>
            <field>
                <name>field3</name>
                <definition>2</definition>
            </field>
        </fields>
    </reader>
    <transformSet>
        <name>anonymise</name>
        <transforms>
            <transform>
                <type>encrypt</type>
                <field>field1</field>
                <properties>
                    <schema>fpe</schema>
                </properties>
            </transform>
            <transform>
                <type>filter</type>
                <field>field2</field>
            </transform>
            <transform>
                <type>mask</type>
                <field>field3</field>
                <properties>
                    <anchor>START</anchor>
                    <numberMasked>4</numberMasked>
                    <offset>2</offset>
                    <character>#</character>
                </properties>
            </transform>
        </transforms>
    </transformSet>
    <route>
        <interface>file-feed</interface>
        <reader>delimited-data</reader>
        <transformSet>anonymise</transformSet>
```

```
        <maxConcurrentReaders>4</maxConcurrentReaders>
    </route>
    <encryptionSchema>
        <name>fpe</name>
        <key>fpekey</key>
        <type>FPE</type>
        <alphabet>0123456789</alphabet>
        <anchor>START</anchor>
        <offset>2</offset>
        <encryptionLength>20</encryptionLength>
    </encryptionSchema>
</beans:beans>
```

Graphical User Interface

A GUI (graphical user interface) application provides a facility to edit and manipulate commonly changed features of any of the described configuration files. These include the list of transforms in use by a particular route, the properties of those transforms and the schemas that they need to function correctly.

Typical Use Case

This section outlines an example use case for the GUI. These are the steps required to modify and save changes to a configuration file:

User launches the GUI
 User enters username and password
 User selects which configuration file they wish to edit from the file browser
 Application uses keys specified in the GUI configuration file to decrypt and open the configuration file. If the keys are password protected, the user will be prompted for the passwords.
 User browses through the available transforms in the configuration file, and selects one to edit.
 User select "Edit Transform"
 User makes necessary updates, and presses the Submit button. The application makes these changes in memory, but nothing has been saved to disk yet
 User presses the Save button. The application uses the keys specified in the GUI configuration to encrypt the configuration file and overwrite the previous configuration file on disk.

The anonymisation system 10 application groups transform together into Transform Sets based on the list of transforms defined within each <transformSet> element in the configuration file. These are ordered lists of transforms which are applied, as a whole, to routes. Each route will have exactly one Transform Set applied to it; however a single Transform Set may be used by several different routes. This relationship is defined in each configuration file.

The default naming scheme will be the transform type followed by its position in the transform set relative to other transforms of the same type. For example in a transform set containing the following transforms (in order):

mask, mask, hash, mask, hash
 The generated names would be
 mask-1, mask-2, hash-1, mask-3, hash-2

These names can be edited by the user using the Edit Transform feature.

Changing the Order of Transforms

A transform may have its position changed, relative to other transforms in a set.

Schemas

Most transform types may be simple and have a basic set of properties that can be edited, however some have a more complicated structure which require the use of a "Schema" to define their properties. For example, the Find and Replace transform maintains a list of things to look for and what to replace each item with. This list can get quite long so it makes sense to group it together into a Schema which can then be shared by several instances of the same transform.

Several Schemas may be defined within a configuration file, each applicable to different types of transform and each of these schemas may be editable by the GUI application.

Extension API

Overview

This section explains the API, which may be used to implement new modules for in the anonymisation system 10. The module types which can be created are:

Data Interfaces
 Reader/Writers
 Transforms
 Tokenisers (token stores)

Creating new modules involves writing a Java class in a package com.detica.*, adding a DDSFModule annotation to the class and updating the anonymisation system 10 configuration file appropriately. For the system to be able to use the new module(s), the Java classes should be compiled into a JAR and included on the Java classpath when starting the anonymisation system 10. Here is a simple example, applicable for Data Interfaces, Reader/Writers and Transforms.

```
Class file:
    com.detica. newmodules;
    @DDSFModule("mynewmodule")
    public class NewModule extends
    (Polling)DataInterface/AbstractReaderWriter/AbstractTransform{
    ...*
    @Override
    ...
    @Override
    ...*
    }
    Configuration file:
    .........*
    <interface/reader/transform>
            ...**
            <type>mynewmodule</type>
            .........
    </interface/reader/transform>
    ............
```

Class Structure for Extensions

Figure 5:
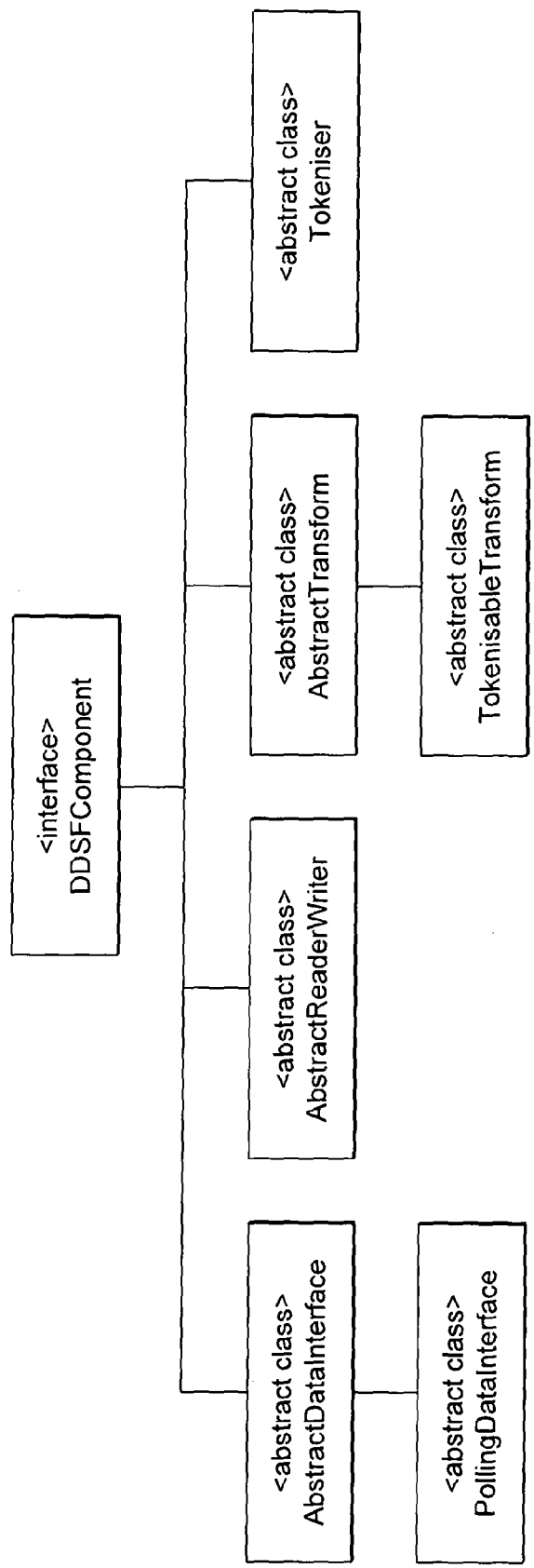
FIG. 5 shows a class diagram of classes used within a system performing the methods of FIGS. 1 and 2.

FIG. 5 shows the structure of the classes which can be extended to create new anonymisation system 10 modules.

The DDSFComponent interface is a root level class for all system components and defines the following two methods:

void initialise( );—This method has the purpose of validating properties and initialising any external resources required by a component, for example database connections.

void clean( );—This method has the purpose of clearing down any external resources which were started up in the initialise method, for example closing down a database connection created in the initialise( ) method.

Every component should preferably implement these methods. Where a superclass already defines these methods, the call "super.initialise( )/super.clean( )" should be used as the first line in the method.

Data Interfaces

Data Interfaces are responsible for processing incoming data from a source and writing it to an output interface. An anonymisation system Framework provides a class called AbstractDataInterface which should preferably be extended to implement data interfaces.

Another class, PollingDataInterface, is defined which extends AbstractDataInterface and defines extra logic for the polling of a source at a specified interval.

The following sections explain which methods need to be overridden when implementing a new custom Data Interface of each type.

Every Data Interface is responsible for creating a SimplexDataStream object for each data unit to process. The SimplexDataStream contains an input channel and an output channel which define where the data is being read from and written to respectively.

AbstractDataInterface

The AbstractDataInterface class contains two methods, which must be overridden by implementing classes. They are described in the following tables 3, 4 and 5.

TABLE 3

| AbstractDataInterface.start( ) | |
| --- | --- |
| Method Name | start( ) |
| Method Function | Starts the interface. Note that this is different from loading external resources, which should be done in the initialise( ) method. |
| Return Type | Void |

TABLE 4

| AbstractDataInterface.stop( ) | |
| --- | --- |
| Method Name | stop( ) |
| Method Function | Stops the interface. Should not clear down external resources, which should be done in clean( ) |
| Return Type | Void |

TABLE 5

| AbstractDataInterface.isRunning( ) | |
| --- | --- |
| Method Name | isRunning( ) |
| Method Function | Whether or not the interface is running. |
| Return Type | boolean |

PollingDataInterface

The PollingDataInterface class can be extended to create a Data Interface which polls an input source for content at a specified interval. For example, the FileSystemInterface within anonymisation system 10 is an extension class of PollingDataInterface. The PollingDataInterface class itself handles all the polling code, and the main method which needs to be implemented is described in the following table 6:

TABLE 6

| PollingDataInterface.getData( ) | |
| --- | --- |
| Method Name | getData( ) |
| Method Function | Find the next available data unit from the input source and produce the appropriate SimplexDataStream. |
| Return Type | SimplexDataStream. The next available data stream should be returned, or null if there is no available incoming data. |

Reader/Writers

Reader/Writers are responsible for reading data from a data interface, splitting it up into individual records and fields, sending the fields off to the transform engine for processing and packaging the resulting data back up into the same form for writing back to the data interface.

The anonymisation system framework provides the AbstractReaderWriter class for extension in order to define new Reader/Writers. The "initialise" and "clean" methods of the DDSFComponent interface are also applicable to the Reader/Writers and should be overridden.

Transforms

A Transform class is responsible for performing a transformation on a piece of data and returning the result. To create a custom transform, the anonymisation system Framework provides the AbstractTransform class which should be extended. The "initialise" and "clean" methods of the DDSFComponent interface are also applicable to the Transform and should be overridden.

Tokenisers (Token Stores)

The anonymisation system 10 includes a database implementation of a token store, for use when using a tokenisable transform with tokenisation turned on. It is also possible to create a custom token store repository.

The anonymisation system 10 is mostly stateless and multithreaded and can scale both horizontally and vertically easily.

The anonymisation system 10 utilises encryption for various purposes:
Encryption of configuration files
Encryption of data fields within a transform
Encryption of the Keystore, which holds the keys used to perform the data field encryption
Encryption of startup keys, which are used to access the keystore and encrypt and decrypt configuration files There are several types of "Key" used by the anonymisation system 10:
Storage Master Key (SMK)—This is the key used to encrypt the anonymisation system 10 application configuration files and encryption Keystore files. There is only one of these per the anonymisation system 10 instance
Startup keys—The SMK should not be stored in clear text. Instead, one or more Startup keys may be required to "unlock" the SMK whenever it is needed. Startup keys may be password protected. In the case of having a single startup key, it should be password protected. All startup keys will be required to unlock the configuration file for the anonymisation system 10 startup, as well as when opening a configuration file in the GUI. It is not recommended that all startup keys are kept on the production server. At least one should be stored remotely, e.g. on a USB drive, and inserted as necessary.
Transformation Keys—These are the encryption keys used to perform encryption of the data fields within the Transform Engine. They are stored in the Keystore, which in turn is encrypted using the SMK The Configuration Management utility is a command line tool which provides the following functionality to manage the encryption aspects of the system:
Generate new encryption keys (including the storage master key) using a cryptographically strong random number generator. The random number generator will be initialised with a cryptographically strong seed. The source of the seed may be operating system dependent.
Encrypt a storage master key using any number of Startup keys
Encrypt/decrypt any configuration files with the storage master key
Generate a Key Store, encrypted with the storage master key A storage master key may be required, and all associated Startup keys should be provided on application start-up.

Figure 6:
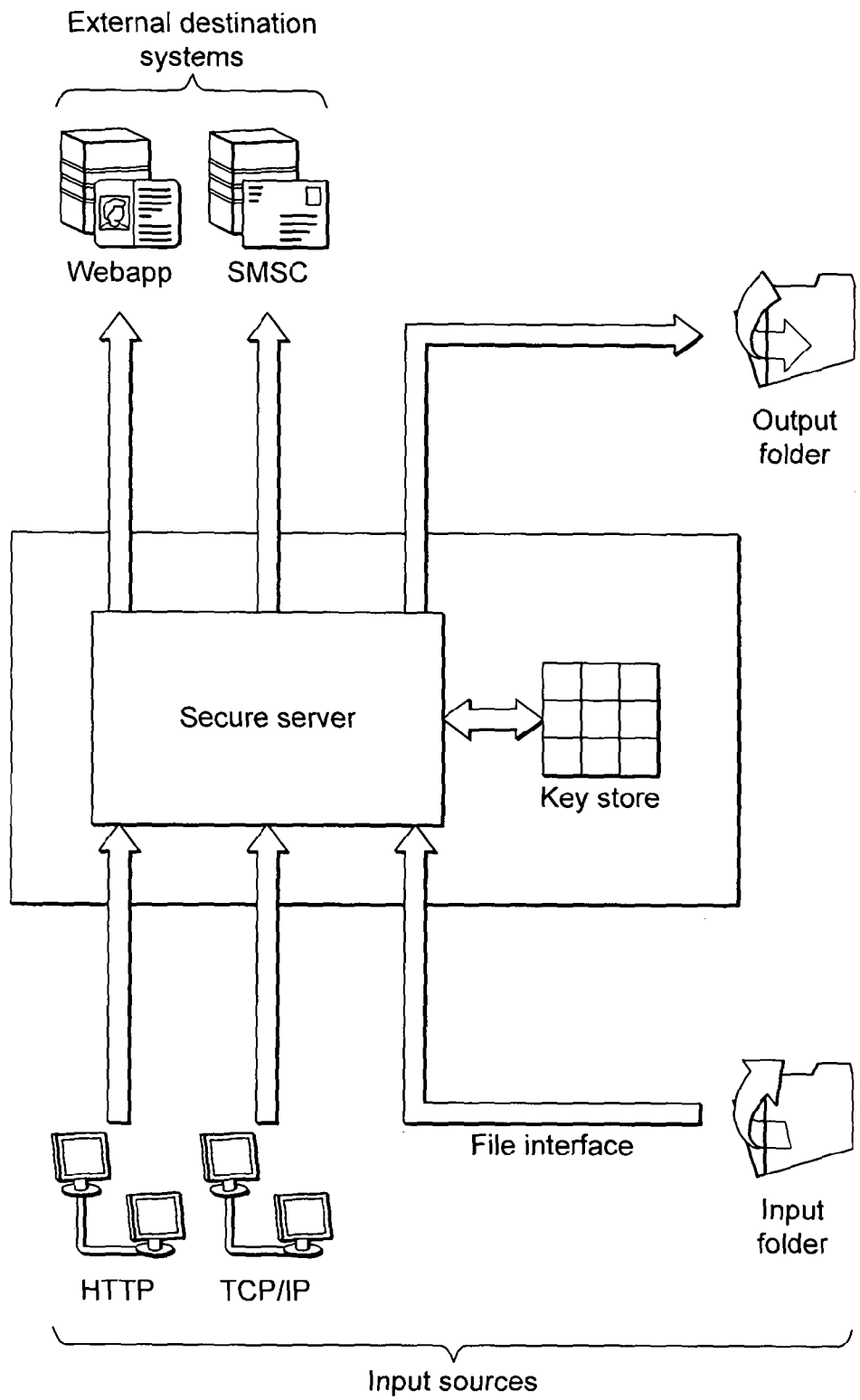
FIG. 6 shows a schematic high level architecture diagram of a system for performing the methods of FIGS. 1 and 2.

The following describes an example of an anonymisation system 10 deployment. This deployment will utilise the file, HTTP and TCP/IP interface, processing a variety of data formats. A high level architecture is shown in FIG. 6.

The deployment consists of 3 main data flows:

Web application access over HTTP.—A Web service is used to return customer data to a browser. The web application is a 3rd party which contains a database of encrypted MSISDNs and unencrypted customer names. A user of the web service knows the real MSISDN and enters this onto a web form to search for customer details. The anonymisation system 10 intercepts the request and encrypts the MSISDN in the POST data of the HTTP request, and decrypts the MSISDN in the HTML page returned by the web application.

SMPP/UCP message processing to an SMSC via TCP/IP—The anonymisation system 10 acts as a proxy to an SMSC, anonymising destination MSISDNs on the way out.

Customer data record transformation of delimited files via the file interface—Customer data files are dropped into the input directory and these are anonymised and placed in the output directory. These directories are then accessed by external systems via SFTP.

Example Input/Output Data

The Configuration file is set up with multiple interfaces and this section gives examples of input and output values for each interface defined above.

File Based Interface

The file based interface is set up to read CSV files consisting of Name, MSISDN and IMEI. An example input file would be:

John Smith,447789123456,123456789012345
Joe Bloggs,447982794563,320247543723897

The name field is set to be partially masked, the MSISDN set to be encrypted, and the IMEI left untransformed, so the output might be as follows:

John #####,985572987352,123456789012345
Joe B#####,952953756154,320247543723897

HTTP Data Interface

The HTTP Data Interface is set up to transform HTTP request data, encrypting the MSISDN and decrypting the MSISDN in the resulting HTML page on the response.

The input would be creating by submitting a form on a web page, but the resulting underlying HTTP request body could be:

msisdn=447789123456&submit=Submit+Query

This msisdn will be encrypted, so the output value could be:

msisdn=671968471158&submit=Submit+Query

This is intercepted and the MSISDN field decrypted by The anonymisation system 10 to the output:

```
<html>
    <head>
        <title>MSISDN Lookup Results</title>
    </head>
    <body>
        <div>
            MSISDN: <span id=\"msisdn\">671968471158</span>
        </div>
        <div>
            Name: <span id=\"name\">Ariel Rineer</span>
        </div>
    </body>
</html>
```

This is intercepted and the MSISDN field decrypted by the anonymisation system 10 to the output:

```
<html>
    <head>
        <title>MSISDN Lookup Results</title>
    </head>
    <body>
        <div>
            MSISDN: <span id=\"msisdn\">447789123456</span>
        </div>
        <div>
            Name: <span id=\"name\">Ariel Rineer</span>
        </div>
    </body>
</html>
```

TCPIP Interface

Two TCP/IP interfaces are set up, one for SMPP and one for UCP. Each of them are set up encrypt a MSISDN field. Example input and output values are shown in FIGS. 5 and 6. (The values here are as viewed with a text editor, and contain unprintable values)

SMPP (The first record shown in FIG. 7 is the value pre encryption; the second record shown in FIG. 7 is the value after encryption):

UCP (The first line shown in FIG. 8 is the value pre encryption; the second line shown in FIG. 8 is the value after encryption)

FIG. 9 shows a list of the functional and non-functional requirements for the anonymisation system.

FIG. 10 shows a non-exhaustive table listing 31 different combinations of sensitive customer data items that may be associated with a customer data record. For each combination of data items in a data set, the table identifies which sensitive data items do not need to be anonymised, and which data items do need to be anonymised, filtered or masked (i.e. transformed) to meet current security requirements.

Masking may include removing detail and granularity from data items, for example location data for cell-IDs could be masked to generalise the location information to a particular town, county or country.

Of course, the anonymisation system can be configured to anonymise any type of data item and any combination of these data items in a data item set. The invention is not limited to use in anonymising and filtering mobile network data or Customer Data Record (CDR) data, and can be applied to any data having a predefined data structure.

As will be appreciated by the skilled person, details of the above embodiment may be varied without departing from the scope of the present invention, as defined by the appended claims.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

| Glossary | |
|---|---|
| Term | Description |
| AES | Advanced Encryption Standard - An industry standard of encryption. An example encryption used in the anonymisation system is |

Glossary

| Term | Description |
|---|---|
| Application keystore | based on AES-256 (the 256-bit version) A serialised Java class file, encrypted using the Storage Master Key, which holds: Transformation keys used for encryption, decryption and hashing within the anonymisation system HTTPS Keystore Passwords, used to read the contents of a password protected HTTPS Keystore File |
| Atomic operation | An operation which acts as a single unit. Traditionally refers to a transaction within a database, in the case of the anonymisation system this is used to indicate that a file should not be placed in the input directory with the configured input suffix in a part-written state. It should be written with a different suffix and then renamed, in order that the system does not start to read a partial file. |
| Configuration file | The XML file which contains the configuration of Route and other system components required to start an instance of the anonymisation system |
| Configuration Management Utility | A command line utility provided with the anonymisation system to enable management of the application keystore, storage master key, startup keys, transformation keys, and the encryption and decryption of relevant files with these keys. |
| Data Interface | The application layer responsible for creating input and output data channels from various raw sources |
| Data Unit | A "data unit" refers to a single piece of data read by one of the interfaces, as follows: File system interface - a single file TCP/IP interface - a single socket connection on the relevant port. HTTP(S) Interface - a single HTTP(S) Request Database - A single database row Messaging - A single Message |
| Encryption Key | A key used for the encryption transform. This may be a 256bit value for Ephemeral encryption or a 2048 bit value for format preserving encryption. See also Transformation Key |
| Encryption Schema | This is a section of the application XML configuration which defines which form of encryption to use in an encryption transform, along with the specific properties for the encryption type. |
| Ephemeral Encryption | A type of encryption where every time a value is encrypted, it encrypts to a different value, but every output can still be decrypted back to the correct original value. |
| Format Preserving Encryption | A type of encryption where an alphabet is specified, and every encrypted value is of the same alphabet and the same length as the input value. |
| Java HTTPS Keystore | This is a serialised java class containing a collection of certificates used by the HTTPS protocol. If HTTPS is to be used, a Java HTTPS keystore must be generated containing the appropriate certificates. Java comes with a utility for creating such a store, called "keytool". Optionally, when creating the store, a Key Password and a Store Password can be specified. |
| Keystore file | The file containing the application keystore |
| keytool | A utility provided with Java for the creation of HTTPS keystores. May be protected with a password, which can be added to the application key store as an aliased key. |
| Redaction | Removing specific text from a field |
| Regular Expression | An expression for defining patterns within text. See www.reqular-expressions.info for a reference guide. |
| Route | A combination of Data Interface, Reader/Writer and TransformSet which defines a "channel" through the system. |
| Schema | A fragment of XML which defines complex properties for particular transforms. Encryption, Tokenisation, Find and Replace and Redaction all have their own Schemas. These can be edited via the GUI. |
| Storage Master Key (SMK) | A randomly generated String which is used to encrypt sensitive configuration files used by the system. The Storage master key is never stored in clear text. Instead it is split up into startup keys which can be stored separately. |

-continued

| Glossary | |
|---|---|
| Term | Description |
| Startup Key | One of a number of keys which when combined together will form the Storage Master Key. Whenever the Storage Master Key is required, all startup keys must be provided. A startup key may optionally be password protected. |
| Tokenisation Schema | This is a section of the application XML configuration which defines which form of tokenisation to use in a tokenisable transform, along with the specific configuration properties for the token store. |
| Transform | The application layer responsible for transforming individual data fields in a variety of ways, in order to anonymise and de-anonymise them. |
| Transform Set | A collection of transforms, grouped together to be applied to several fields within a single data record |
| Transformation Key | A key used within certain transforms. Most commonly this will be used for encryption; however keys are also required by the hashing transform. This term is an overarching term of any such key used by any relevant transform. This is generally a 256bit value with the exception of format preserving encryption when it is a 2048bit value. The transformation keys are stored in the application keystore. |

The invention claimed is:

1. A method of anonymizing data comprising:
reading parameters of an anonymization procedure from a configurable anonymization procedure resource, wherein the read parameters defines a workflow for receiving data to be anonymized and for applying one or more transformations thereto, and wherein the read parameters also includes an indication of an allowable number of concurrent processing threads for receiving the data and applying the one or more anonymization transformations;
receiving data to be anonymized from a data source according to the defined workflow, wherein the data source is identifiable from one or more of the read parameters; and
applying one or more anonymization transformations to the received data according to the defined workflow, wherein the one or more transformations include transforming at least an original portion of the received data into a transformed portion, and wherein the steps of receiving data and applying one or more anonymization transformations are performed using no more than the allowable number of concurrent processing threads indicated in the read parameters.

2. The method of claim 1, wherein the one or more anonymization transformations to be applied to the received data are identified in the read parameters.

3. The method of claim 1, wherein the read parameters further include or identify any one or more of:
a transformation configuration resource that includes a description of the one or more transformations to be applied to the received data;
a reader configuration resource that includes configuration information for reading the received data;
an input directory of the data source to scan for received data;
an output directory of the data source to write transformed data to following the application of the one or more transformations; and
a writer configuration resource that includes configuration information for writing the transformed data.

4. The method according to claim 1, wherein the configurable anonymization procedure resource is encrypted.

5. The method according to claim 1, wherein the original portion of the received data is recoverable from the transformed portion using previously stored information.

6. The method of claim 5, wherein the previously stored information comprises the transformed portion stored with the original portion of received data.

7. The method of claim 5, wherein the previously stored information is cryptographic material for decrypting the transformed portion into the original portion of received data.

8. The method according to claim 1, wherein the applied one or more anonymization transformations are one or more selected from the group consisting of: hashing; redacting; filtering; find and replacing; replacement with random values; validation; and masking.

9. The method according to claim 3, wherein at least one of the transformation configuration resource and the configurable anonymization procedure resource are in XML format.

10. The method according to claim 1, wherein the received data are call data records.

11. The method according to claim 1, wherein the anonymization procedure includes receiving the data from an input channel and writing the anonymized data to an output channel.

12. The method according to claim 1, wherein the received data originates from any one or more of: a database, file system, mobile network, and real time data feed.

13. The method according to claim 1 further comprising:
receiving an input comprising the transformed portion and a new portion; and
recovering the original portion of the received data from the transformed portion using stored information.

14. A non-transitory computer-readable medium having stored thereon program instructions that, when executed on a computer, cause the computer to perform the method of claim 1.

15. A computer programmed to perform the method of claim 1.

* * * * *